United States Patent [19]
Ballard et al.

[11] Patent Number: 5,943,629
[45] Date of Patent: Aug. 24, 1999

[54] METHOD AND APPARATUS FOR REAL-TIME IONOSPHERIC MAPPING AND DYNAMIC FORECASTING

[75] Inventors: John W. Ballard, Los Altos, Calif.; John M. Goodman, Alexandria, Va.; Roy A. Sasselli, San Jose, Calif.

[73] Assignee: TCI International, Inc., Sunnyvale, Calif.

[21] Appl. No.: 08/828,981

[22] Filed: Mar. 31, 1997

Related U.S. Application Data

[60] Provisional application No. 60/014,674, Apr. 1, 1996.

[51] Int. Cl.$^6$ .................................................... G06F 19/00
[52] U.S. Cl. ................................................................ 702/2
[58] Field of Search ................................... 702/2, 3, 4, 5; 73/170.16, 170.24, 170.27; 342/26

[56] References Cited

U.S. PATENT DOCUMENTS

| | | | |
|---|---|---|---|
| 4,980,924 | 12/1990 | Reed et al. | 455/63 |
| 5,230,076 | 7/1993 | Wilkinson | 455/62 |
| 5,428,358 | 6/1995 | Gardner | 342/26 |
| 5,585,800 | 12/1996 | Chubb | 342/357 |

OTHER PUBLICATIONS

Lynn, K.J.W., 1995, "The Application of Ionosondes to HF Real–Time Frequency Management in Northern Australia", in *Ionosonde Networks and Stations*, Proceedings of Session G6 at the XXIVth General Assembly of the International Union of Radio Science (URSI), Kyoto, Japan (1993), published by the National Geophysical Data Center for WDC–A for Solar Terrestrial Physics, 325 Broadway, Boulder CO; pp. 59–64.

Buchau, Jurgen, et al, 1995, "The Digital Ionospheric Sounding System Network of the U.S. Air Force Air Weather Service", in *Ionosonde Networks and Stations*, Proceedings of Session G6 at the XXIVth General Assembly of the International Union of Radio Science (URSI), Kyoto, Japan (1993), published by the National Geophysical Data Center for WDC–A for Solar–Terrestrial Physics, 325 Broadway, Boulder CO; pp. 16–20.

(3) Wheadon, N.S., et al., 1994, "Ionospheric Modelling and Target Coordinate Registration for HF Sky–wave Radars", in HF Radio Systems and Techniques, Jul. 4–7, 1994, Conference Publication No. 392, ©IEE (London, UK).

Lynn, K.J.W. and T.D. Kelley, 1993, "A New Real–Time Frequency Management Technique Based On Vertical Sounding Demonstrated Over a 2598 Km Circuit", in the 1993 *Ionospheric Effects Symposium*, (edited by J. Goodman), published by SRI, available through NTIS, Springfield VA.

(List continued on next page.)

*Primary Examiner*—Donald E. McElheny, Jr.
*Attorney, Agent, or Firm*—Ritter, Van Pelt and Yi, LLP

[57] ABSTRACT

A system and method are disclosed for providing a real-time map of ionospheric properties. An ionospheric model is provided that provides a baseline description of ionospheric properties. A primary data source is provided that is indicative of real time propagation data obtained for the ionosphere in the vicinity of a control point. The real time propagation data is indicative of the critical frequency for the ionospheric layer. The ionospheric model is modified based on the real time propagation data obtained for the ionosphere in the vicinity of the control point. This includes modifying the critical frequency for the ionospheric layer. In this manner, the ionospheric model is updated according to real time propagation data.

25 Claims, 14 Drawing Sheets

OTHER PUBLICATIONS

J.M. Goodman, et al, "Toward the Improvement in HF Communication Performance Based Upon Dynamic Media Assessment within Regional and Global Environments", in the May/Jun. 1995 *Marine Electronics*, vol. 5, No. 8; pp. 28–33.

Aeronautical Radio, Inc., Draft 1 of Project Paper 634, "HF Data Link System Design Guidelines", Aug. 1995, p. 37.

Goodman, et al, Aug. 1995, Charts for presentation at HF 95 Nordic Shortwave Conference Communications Beyond the Horizon.

FIGURE 8d      FIGURE 8e

$$n = \left(1 - \frac{81 N_e}{f^2}\right)^{1/2}$$

ANALYTICAL PROCEDURE (BASIC)

MUF = MUF (SSN; <Pi>)

SSN = SSN (MUF; <Pi>)
and
F = F (MOF; <Pi>) ; MUF = MOF where the MUF is the Ioncap prediction for a specific sunpot number (SSN) and input parametr set <Pi>, MOF is the <u>observed</u> Maximum Frequency using ARCS/Chirpsounder, and F is the computed pseudo flux.

SP-LPM (Single-Point Method)

$CP_i$ is the Control Point (midpath)

METHOD AND APPARATUS FOR REAL-TIME IONOSPHERIC MAPPING AND DYNAMIC FORECASTING

CROSS REFERENCE TO RELATED APPLICATIONS

This application claims priority to U.S. provisional application Ser. No. 60/014,674, filed Apr. 1, 1996, which is herein incorporated by reference.

BACKGROUND OF THE INVENTION

1. Field of the Invention

The present invention relates generally to methods and apparatuses for determining and accurately predicting high frequency radio communication performance. More specifically, the invention relates to creating a real time Ionospheric map and forecasting based on a climatological model and updated data from sounders and other resources.

2. Description of the Related Art

For most of this century, communications with ships at sea has been carried out primarily in the high-frequency (HF) portion of the radio spectrum. Signals in this frequency range have the property of being reflected by the ionosphere, and therefore can reach very long distances without the use of satellites or repeaters.

The main difficulty encountered in using HF radio waves to communicate is dealing with the variability of the radio propagation mechanism, specifically the variability of the reflection of radio waves by the ionosphere. The ionosphere is created by the chaotic process of solar radiation and the interaction of that radiation with the earth's magnetic field. The prediction models of ionospheric propagation used today are generally effective in predicting long-term trends, but prediction of short-term phenomena has not been successful.

Programs have been written to predict propagation of HF radio waves. These include IONCAP, VOACAP and ICEPAC. Each of these programs uses an ionospheric prediction model based on limited historical data. In each case the election density of the ionosphere, which determines the reflective properties of the ionosphere, is modeled as a function of certain input data. The input data may include time, date, sunspot number, and geographic location. The modeling function predicts the median behavior of the ionosphere as well as HF propagation for the conditions specified by the input data. In each case, however, the modeling function prediction is subject to inaccuracy and no adequate method has been devised to correct the inaccuracies in a self consistent manner.

Maintaining an HF communication circuit requires managing many alternate communication paths and frequencies. Because of the variability of the ionosphere, skilled operators are required to maintain the links in HF communication circuits. Certain improvements have been made over the years. For example, HF communications systems now use an instrument which tests the ionospheric path one wishes to use and displays or ranks the frequencies available in order of their efficacy. Such an instrument is typified by the BR Communications, Inc. linear FM ionospheric sounder.

Another difficulty encountered in using HF communications is that the HF spectrum is generally congested. This congestion increases the likelihood that interference between different signals. Ambient radio noise impacts receiver efficiency. In planning an HF communications network, it would therefore be desirable to have knowledge about propagation conditions over an extended area so that a large number of usable frequencies and paths could be chosen consistent with FCC and ITU-R rules and regulations. This would enable the system to reroute signals to paths in regions with less traffic and expand the capacity of the network. The key to a truly reliable automatic HF communications network is therefore accurate knowledge of current propagation and radio interference conditions.

Because of the lack of reliable forecasts, the most accurate and reliable existing method for fixed platforms or mobile platforms such as ships or airplanes to obtain knowledge of propagation and radio interference is through direct real-time measurement and evaluation of ionospheric conditions between the desired communication nodes using ionospheric sounders. The sounders may be coupled with computers to generate an HF frequency management system that controls the operation of the HF communications radios so that the radios may be automatically tuned to a channel on which the HF waves are currently being reflected by the ionosphere along the desired communication path and on which there is not excessive traffic. One example of a HF Frequency Management System used by the military is the Chirpsounder®-based system.

The Maritime ARCS (Automatic Radio Calling System) is illustrative of a Chirpsounder-based automatic frequency management system combined with an automatic reporting and linking system for data and single side band (SSB) voice communications between ship and shore. The basis for the enhanced performance and ease of use of ARCS is automatic tuning of the ship's HF radio based on real-time knowledge of propagation and interference.

ARCS uses Chirpsounders to periodically measure ship-shore propagation conditions (signal-to-noise ratio, multipath, distortion, etc.) over the HF band so that the radio frequency of the HF communications channel can be changed in real time to the frequency that can best maintain reliable communications. To accomplish this, a Chirpsounder transmitter at the shore station transmits a low power (10 watt) sweeping RF test signal from 2 to 30 Mhz, typically four times per hour. On each ship, a Chirpsounder receiver automatically synchronizes and demodulates the transmitted Chirp™ waveform by tuning the receiver in synchronization with the transmitted signal. The receiver analyzes the received Chirp signal to determine propagation quality as a function of frequency. Based on this measurement, the Chirpsounder automatically ranks the propagation quality of all the assigned operating frequencies to each station. Those frequencies or channels with a high quality ranking are recommended for use, while those with a low quality ranking are rejected. In addition, the Chirpsounder receiver routinely samples the highly ranked channels to determine if they are free of interference from other users. This occupancy measurement is used to further refine the individual channel rankings, so that the highest ranked channels will support reliable HF propagation and at the same time are unoccupied.

A large worldwide network of operating Chirpsounder transmitters is currently in use by various government and military organizations. Most of these organizations maintain their Chirpsounder transmissions on a published schedule, thereby allowing commercial users to use these transmissions free of charge and without restrictions. Thus, ARCS is able to take advantage of the existing worldwide Chirpsounder network and infrastructure to economically provide the benefits of Chirpsounder-based automatic frequency management to the commercial maritime community.

The Chirpsounder system also incorporates Chirpcomm™, an automatic spread spectrum order-wire feature, which allows brief emergency or system management messages to be transmitted from shore to ship with very high reliability. The Chirpcomm message data is superimposed on the basic Chirpsounder sweep, and therefore is transmitted on all frequencies 2–30 Mhz. Because Chirpcomm uses the complete HF band, messages can be sent with a very high degree of confidence without needing to select a "good" frequency (i.e., a high quality narrow band channel). In addition, the signal processing used to demodulate the Chirpcomm signal provides protection from interference and signal distortion. Because the Chirpcomm message automatically modulates a standard Chirpsounder sweep, no additional transmissions are required—a new 40-character message can be sent on each Chirpsounder sweep.

Normally, Chirpcomm is only used to transmit a two-character shore station ID. However, if the shore station wants to contact the ship, the service provider can generate a "call-in" command by placing the ship's ARCS ID in a Chirpcomm message. The ARCS ID is an alphanumeric code unique to each ARCS controller, much like the ship's radio call sign. When the ARCS receiver/controller decodes the Chirpcomm message and matches the ARCS ID in the message to the ship's own ID, the ship's ARCS controller will automatically place a call to the service provider in response to the Chirpcomm "call-in" command. The shore station then transfers whatever message traffic is waiting. By placing multiple ARCS IDs in a Chirpcomm message, the shore can initiate call-in commands for up to eleven ships for each Chirpcomm message sent.

The use of Chirpsounders and ARCS has made it possible for individual ships or planes to determine propagation data to individual base HF communication stations, but there is no real-time ionospheric mapping system in existence today to support large HF communications networks over large regions. Individual Communicators may empirically test various communication paths using Chirpsounders and ARCS, but no system level network propagation management system exists. A large area real-time map would be desirable because it would enable management of communication network resources at a system level.

The lack of an appropriate real-time data input in prior art systems for application to remote areas of interest is even more limiting that any lack of model flexibility or generality. Prior art systems rely on land-based Vertical Incidence Sounders (VIS). Vertical Incidence Sounders include a transmitter and receiver located at the same point and obtain data from the ionosphere directly over that point. Data points are thus obtained only for ionospheric regions overlying the land masses where the VIS are located. This is problematic because most of the important region for communications may overlay ocean regions, and ionospheric characteristics may vary significantly in those regions.

Prior art real-time ionospheric mapping systems are inadequate because they are based upon models which are updated by instruments which sample ionospheric parameters either directly (i.e., VIS or nearly directly (i.e., Quasi-VIS) overhead. Prior art systems do not use OIS methods for developing independent estimates of the various ionospheric layers for application in mapping. Specifically, prior art does not include any scheme for real-time modeling of the sporadic E layer.

It would be desirable if a real-time mapping and prediction system could be developed which could use data obtained over ocean regions using Oblique Incidence Sounders (OIS). Oblique Incidence Sounders include a transmitter and a receiver at a location remote from the transmitter. Data obtained from Oblique Incidence Sounders is from ionosphere regions overlying points between the transmitter and receiver, where no equipment may necessarily be located. It would also be desirable if data other than sounder data could be used. It would also be beneficial if such a mapping system could process data in a manner that allows data obtained from various locations to influence the state of the model in different locations according to the expected correlation of the conditions between the locations. Additionally, it would be desirable if the system could adapt based on the availability of data points in different regions.

In view of the foregoing, there is a needed for methods and apparatuses for gathering current propagation data over a large network both for real time communication and for making accurate short-term predictions of propagation conditions over the network. Dynamic forecasting based on a real-time data map would for the first time provide truly accurate short-term propagation forecasting for the vast oceanic regions now unsampled by prior art systems. The problems of HF networks with the peakiness (viz., temporal clustering) of traffic could be addressed. A large area real-time map of ionospheric propagation characteristics would enable an HF network to reroute traffic to alternate paths during rush hour periods to take advantage of unused capacity when certain paths are full.

SUMMARY OF THE INVENTION

Accordingly, the present invention provides a system and method for providing a real-time map of Ionospheric propagation together with a dynamic nowcasting and forecasting of HF performance conditions. The present invention produces an accurate ionospheric model by correcting inaccuracies in existing models with feedback from real-time data in the ionospheric regions of interest. In one embodiment, a Limited Pseudoflux method is used for changing individual layers of an ionospheric model based on data that is relevant to those layers. For network troubleshooting and after the fact performance assessment, a hindcasting method is also used.

In one embodiment, A system and method are disclosed for providing a real-time map of ionospheric properties. An ionospheric model is provided that provides a baseline description of ionospheric properties. The ionospheric model a critical frequency for an ionospheric layer. A primary data source is provided that is indicative of real time propagation data obtained for the ionosphere in the vicinity of a control point. The real time propagation data is indicative of the critical frequency for the ionospheric layer. The ionospheric model is modified based on the real time propagation data obtained for the ionosphere in the vicinity of the control point. This includes modifying the critical frequency for the ionospheric layer. In this manner, the ionospheric model is updated according to real time propagation data.

In another embodiment, high frequency signal propagation characteristics are estimated using the modified ionospheric model.

In another embodiment, modifying the ionospheric model based on the real time propagation data obtained for the ionosphere includes determining ionospheric characteristics in the vicinity of a grid point based upon propagation data obtained for the ionosphere in the vicinity of a plurality of control points. The influence of the propagation data obtained for the ionosphere in the vicinity of each of the plurality of control points on the grid point is determined as a function of the distance from each of the control points to the grid point.

In another embodiment, the real time propagation data obtained for the ionosphere in the vicinity of a control point includes data obtained from oblique incidence sounders, the oblique incidence sounders being located so that a one hop communication path exists between the sounders such that a signal transmitted between the oblique incidence sounders is reflected in the vicinity of the control point.

In another embodiment, ionospheric data is provided to a single-frequency GPS module, and the group path delay of the GPS satellite signals is compensated for using the ionospheric data.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
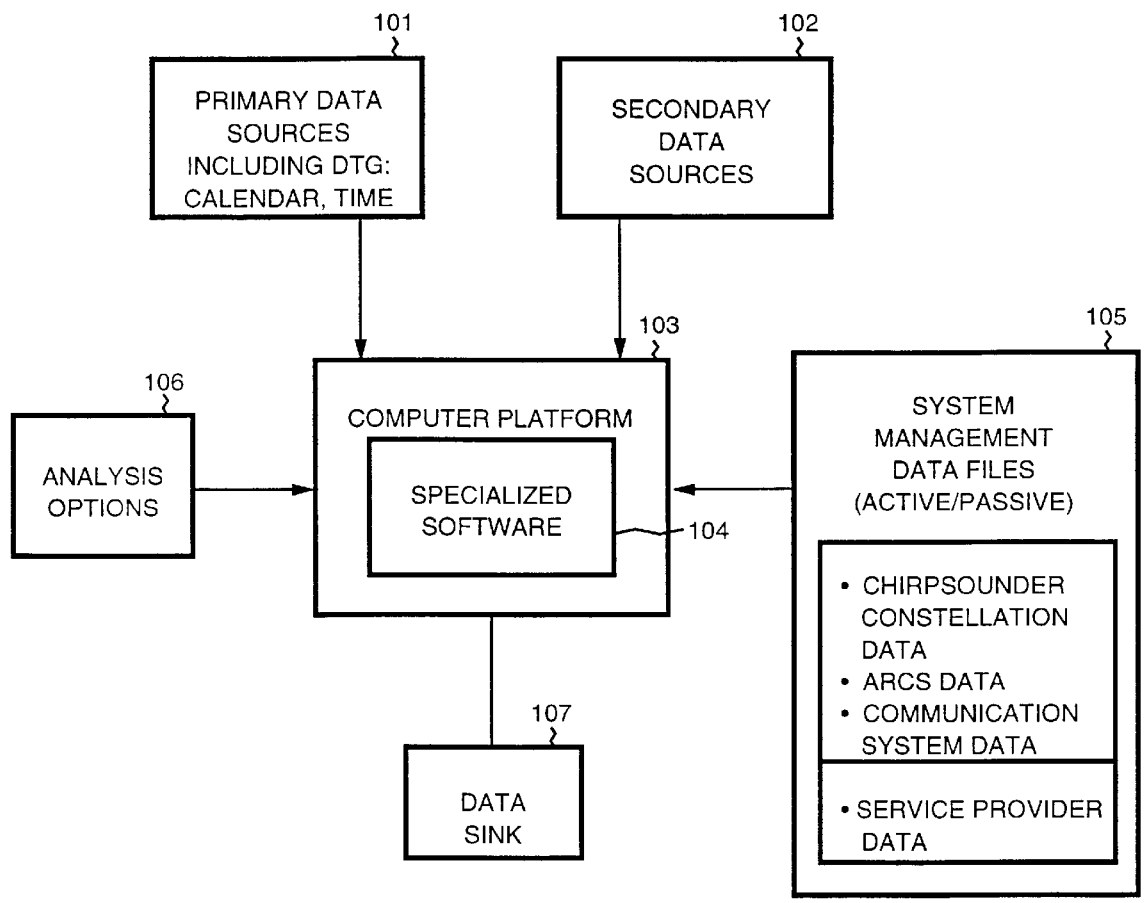
FIG. 1 is a schematic diagram illustrating the Dynacast® system for real-time mapping, analysis, nowcasting, hindcasting, and forecasting of ionospheric properties and HF communication parameters.

FIG. 1 is a schematic diagram illustrating the Dynacast® system for real-time mapping, analysis, nowcasting, hindcasting, and forecasting of ionospheric properties and HF communication parameters. These ionospheric properties and HF communication parameters may be collectively referred to as "media properties." This analytical capability includes an evaluation of media properties in the past, present, and future. Dynacast is a system for dynamic nowcasting and forecasting of the ionosphere and the HF propagation environment. Dynacast includes the following capabilities: assessment of the medium in real time (i.e., nowcasting), short-term prediction of the medium (i.e., forecasting), and evaluation of previous media properties (i.e., hindcasting).

FIG. 1 shows the fundamental architecture of the real-time mapping system. Primary data sources 101 include year, day of year, Universal Time (UT), and data from other sources of primary data such as TCI/BR's Automatic Radio Calling System (ARCS). Secondary data sources 102 include geophysical data bases available through the World Wide Web or dedicated phone line. A computer platform 103 includes a specialized software module 104 that enables the determination of ionospheric and HF propagation parameters through a process by which a specified climatological model is updated through incorporation of the Primary Data and Secondary Data. Computer platform 103 organizes the data, performs algorithmic operations and mapping of ionospheric data, and hosts various applications. System management data files 5 include Chirpsounder constellation data, ARCS data, communication system data, and Service Provider data. A set of Dynacast Analysis Options 106 are specified by the user who decides which analysis models are used. The term Service Provider is a generic expression of any Dynacast customer having communication services as the requirement. Service Provider Data includes communication station ID, location, power levels, antenna specifications, etc. A Dynacast Data Sink (DDS) 107 stores output data for archiving and post analysis. In one embodiment, most of the modules shown in FIG. 1 are housed within a single physical box. The primary data sources are developed within an ARCS-compliant or equivalent platform having excess processing capacity on which the Dynacast analysis engine may be implemented. For example, one embodiment has all of the Dynacast engine housed within a computer which is physically part of the Model RCS-7 Chirpsounder platform.

Figure 2:
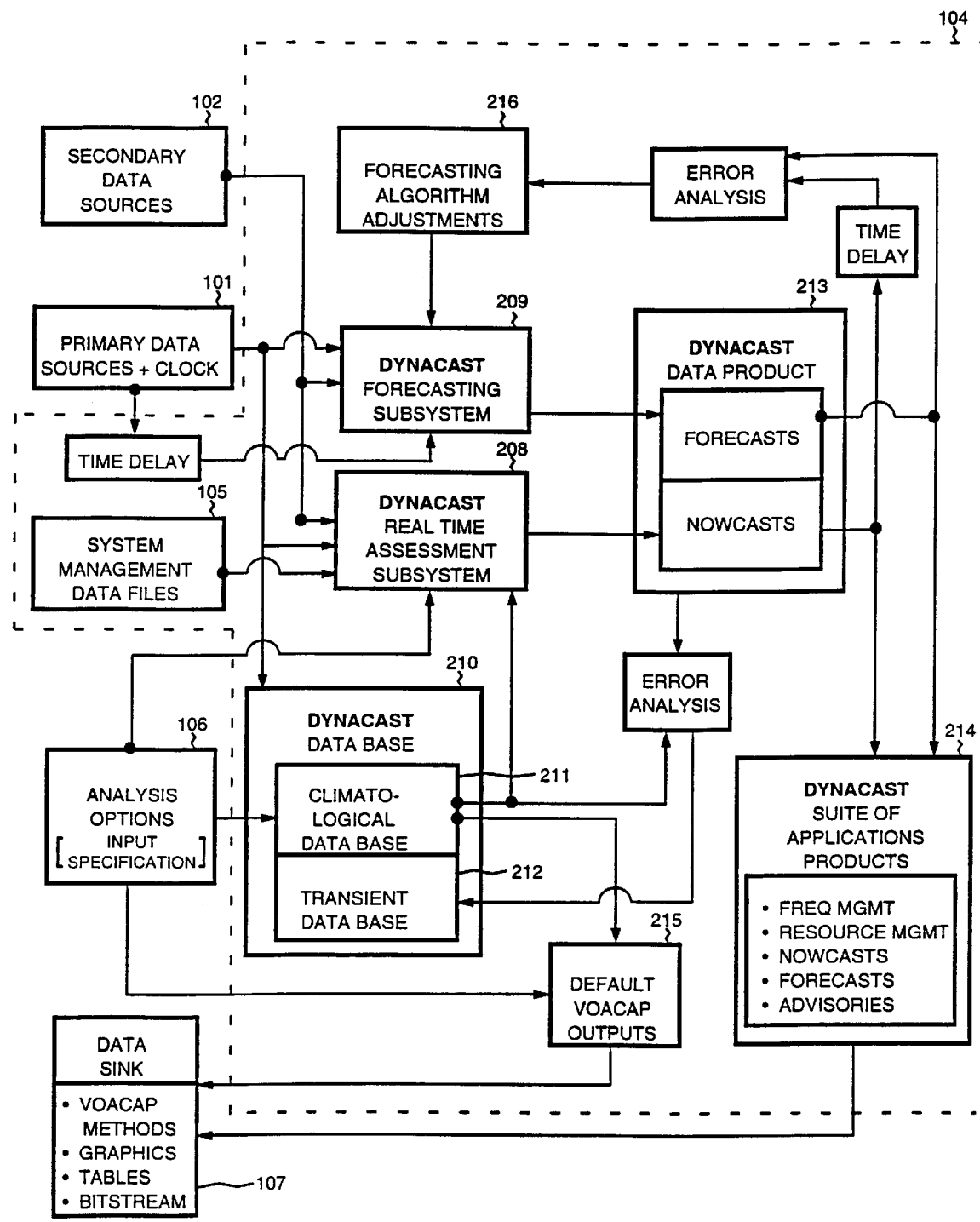
FIG. 2 shows more detail concerning a specialized software module.

FIG. 2 shows more detail concerning one embodiment, particularly with respect to specialized software module 104. Two systems are used within Dynacast: a Dynacast Real-Time Assessment System 208, and a Dynacast Forecasting System 209. Dynacast Forecasting System 209 depends upon Dynacast Real-Time Assessment System 208 and both are dependent upon Primary data sources 101 and Secondary data sources 102 as well as Dynacast System Management Data Files 105 and Dynacast Analysis Options 106. A key component in Dynacast is the Dynacast Data Base 210. The Dynacast Data Base includes a Climatological Data Base 211, and a Transient Data Base (TDB) 212. Transient Data Base 12 is a specification of the background ionosphere as derived from the Dynacast Real-Time Assessment System 208 over a suitable reckoning period specified by the operator/analyst. The Climatological Data Base is the so-called CCIR data base of ionospheric parameters, as described in CCIR, 1986, "Atlas of Ionospheric Coefficients", Rpt. 340-6, in Recommendations and Reports of the CCIR, 1986, Propagation in Ionized Media, Vol. VI (VXIth Plenary Assembly in Dubrovnik), ITU, Geneva, which is herein incorporated by reference. The Dynacast Data Base develops the Dynacast Data Product 213, including "nowcasts" and "forecasts" as appropriate, and the output is forwarded to a set of Dynacast Application Products 214, and ultimately to the specified Dynacast Data Sink 107 for archiving or post-analysis. Post-analysis is sometimes referred to as "hindcasting". Hindcasting may be used to examine communication failures which have been detected in the past, so that methods for mitigation or circumvention may be postulated and developed. In addition to the Dynacast Applications Products 214, standard VOACAP methods 215 are available for testing purposes, or as defaults, if the preferred Dynacast methodology is deselected.

Dynacast employs two schemes for self-adjustment. These self-adjustment schemes are unique to Dynacast, and take advantage of data available from the ARCS/Chirpsounder® technology. One scheme involves improvement in the forecasting algorithm employed, and the other involves an improvement in the underlying climatological database. In the first instance, the preferred embodiment compares nowcasts and forecasts from the Dynacast data product 113 and derives a parameterized error based upon the time delay specified by the user. Longer time delays would be expected to generate greater errors. The present method tests algorithmic approaches to minimize this error, thereby generating an improved Dynacast Forecasting System 209 through the incorporation of Forecasting Algorithm Adjustments, 216. In the second instance, nowcasts are compared from the Dynacast data product 213 with the Climatological Data Base 211 to produce a Transient Data Base 212. Either the Climatological Data Base or the Transient Data Base may be used, and the specification is made by the user as a part of specified analysis options 106.

A climatological model is a model which represents the median behavior of the property being modeled. The median is generally reckoned over an epoch of time (i.e., a month), and is parameterized in terms of time-of-day, month-of-year, geographical location, and other geophysical parameters. A climatological description enables a user to estimate the median behavior of a specified property (i.e., random variable) under a specified set of conditions. A climatological model of the ionosphere is a statistical representation of the worldwide electron density distribution. This distribution is defined by median values of the electron density associated with peaks of electron density of identifiable layers in the ionosphere (viz., D, E, F1, and F2), the respective layer heights, and an altitude profile. These data are parameterized in terms of time (viz., hour, day, month), geographic and geomagnetic coordinates, and sunspot number.

A skywave prediction process or model predicts the propagation of skywaves based on the predicted properties of the ionosphere produced by the climatological model. In this context, the ionospheric representations generated by the climatological model are submodels.

Figure 3:
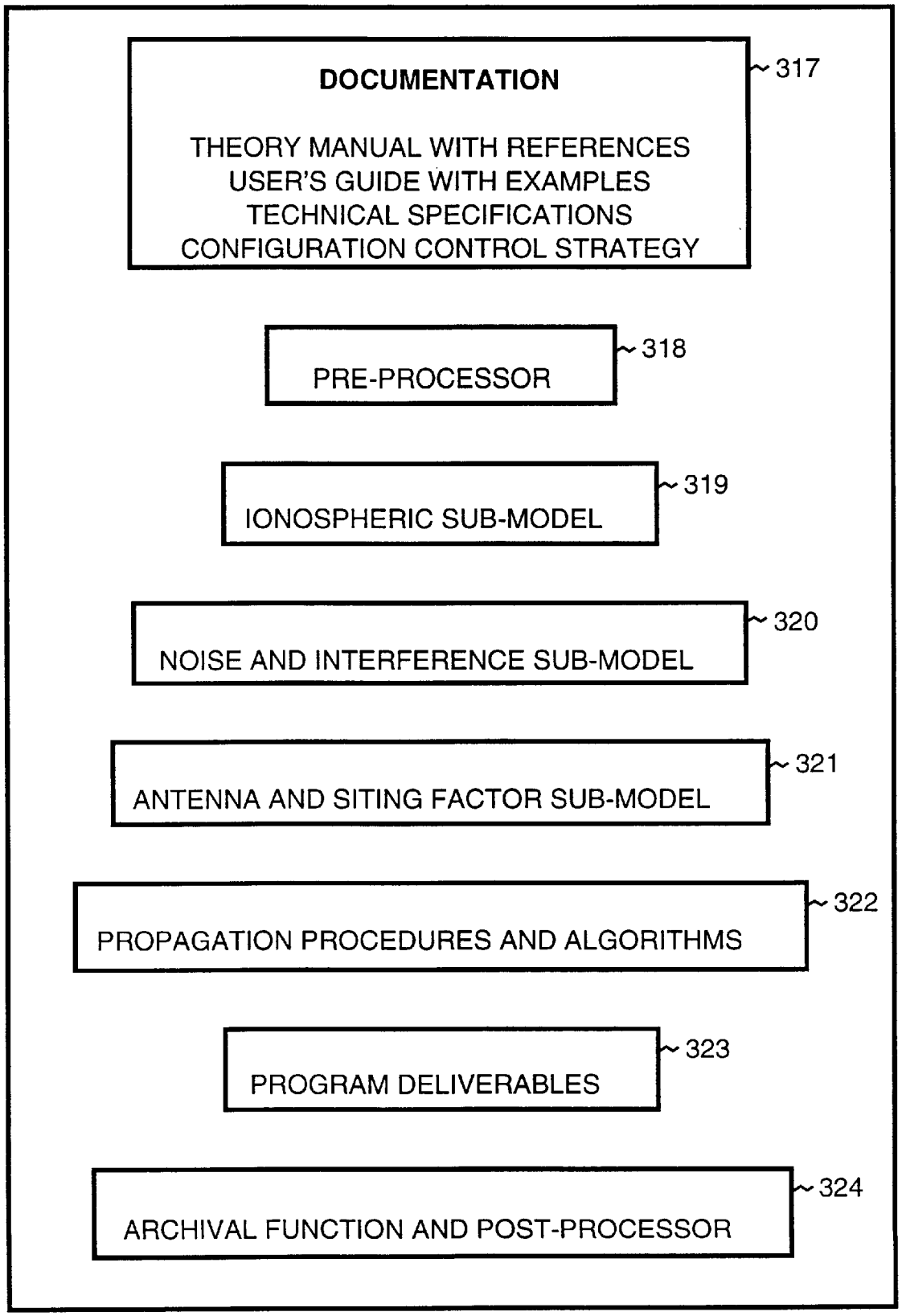
FIG. 3 depicts the major components of a skywave prediction program, one that is based upon a climatological description of the ionosphere.

FIG. 3 depicts the major components of a skywave prediction program, one that is based upon a climatological description of the ionosphere. Documentation 317 is a major element. Typically the model includes a user-friendly I/O interface 318, an ionospheric submodel 319, a noise model 320, antenna and siting submodel 321, and a propagation submodel 322. Usually there is a capability to tailor output to suit specified applications 323. An archival function 324 may also be available. This system is further described in Goodman, J. M., 1992, HF Communication: Science & Technology, Van Nostrand Reinhold, New York, which is herein incorporated by reference.

Climatological models which may be used in the scheme include those which have been developed by the U.S. Government and are in the public domain. The preferred embodiment uses a derivative of IONCAP, which is the accepted standard for static predictions of HF communication performance. It is described in Teters, L. R., J. L. Lloyd, G. W. Haydon, and D. L. Lucas, 1983, "Estimating the Performance of Telecommunication Systems Using the Ionospheric Transmission Channel: Ionospheric Communications Analysis and Prediction Program, IONCAP User's Manual", NTIA Report 83-17, NTIS Order No. N70-24144, Springfield Va., which is herein incorporated by reference. The invention has been structured such that selection of the particular ionospheric sub-model within Dynacast is not critical. It will be apparent to one of ordinary skill in the art that other models could be substituted.

Figure 4:
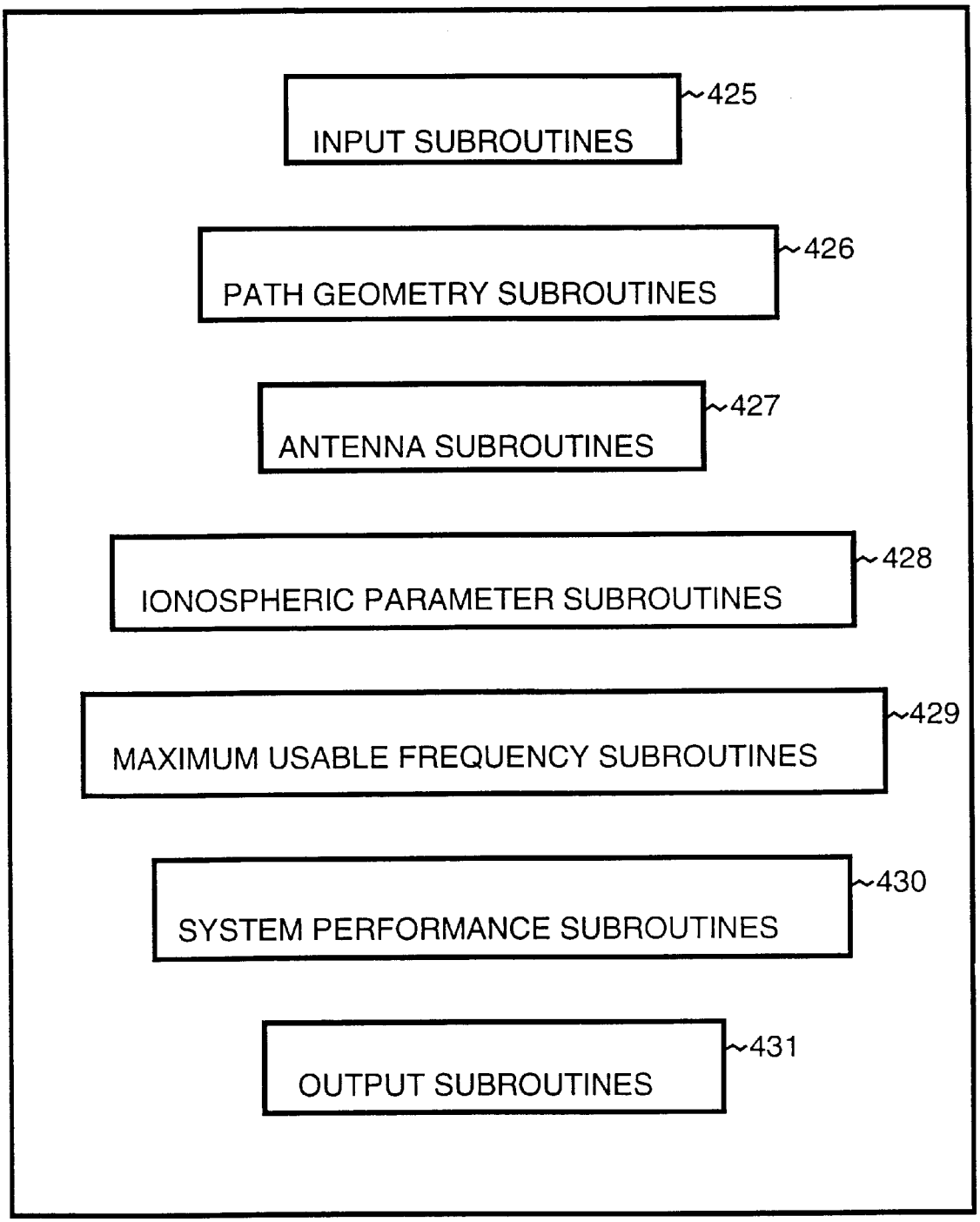
FIG. 4 shows the structure of the IONCAP prediction program.

IONCAP, an acronym for Ionospheric Communications Analysis and Prediction Program, was developed by the Institute for Telecommunication Sciences (ITS) of the Department of Commerce. The program is divided into seven largely independent components, as shown in FIG. 4. They are: Input Subroutines 25, Path Geometry Subroutines 26, Antenna Subroutines 27, Ionospheric Parameter Subroutines 28, Maximum Usable Frequency Subroutines 29, System Performance Subroutines 30, and Output Subroutines 31. This organization is consistent with the generic description of a skywave prediction program provided in FIG. 3. There are other models which are similar to IONCAP in some respects, and a number of improvements have been made by ITS engineers. These models are fully described in Goodman, at pp.315–324. The Voice of America has made improvements in several of the subroutines, and have published a refined IONCAP derivative called VOACAP (see DeBlasio, L. M., G. Lane, and F. Rhoads, 1993, "Model Enhancements: IONCAP and VOACAP Methodology Comparisons", in 1993 Ionospheric Effects Symposium, J. M. Goodman (Editor-in-Chief), NTIS, Springfield, Va., which is herein incorporated by reference). We shall refer to VOACAP as the baseline model for our invention. However, our methodology shall apply equally to other models which are closely related to VOACAP, including IONCAP and ICEPAC. ICEPAC is described in Hand, Greg and Jeanne Ratzloff, 1994, "Quick Reference Guide: ICEPAC HF Propagation Program", Institute for Telecommunication Sciences, National Telecommunications and Information Administration, U.S. Dept. of Commerce, Boulder, Colo. which is herein incorporated by reference.

Figure 5:
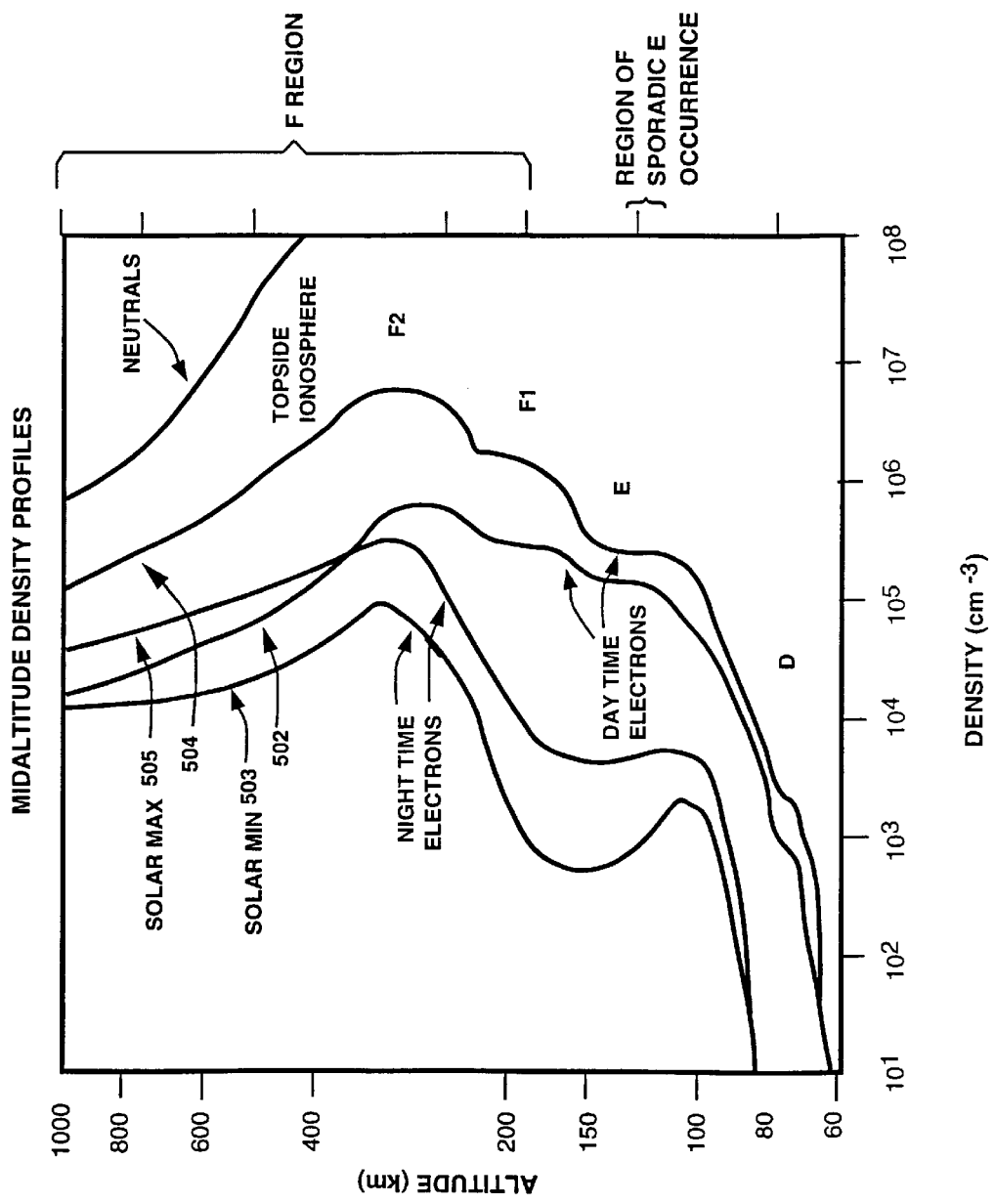
FIG. 5 depicts a general set of ionospheric profiles.

Common to all models, including the baseline model used in a preferred embodiment, is the ionospheric profile. This is a characterization of electron density versus height above the earth's surface. FIG. 5 depicts a general set of ionospheric profiles. Four examples are given: Curves 502 and 503 correspond to day and night, respectively, for solar maximum and Curves 504 and 505 correspond to day and night, respectively, for solar minimum conditions at temperate latitudes. (Other latitude regions, such as the equatorial and high latitude, depart from this depiction, but the general picture is the same. The profiles shown are average shapes, and may vary with changing conditions.) Regions designated are the D-region, E-region, F1-layer, and F2-layer. The F1- and F2-layers are sometimes organized into a single layer which is referred to as the F-region. This is especially evident during nocturnal hours. Also depicted is the altitude region where the phenomenon of sporadic E occurs. The terms region and layer are used interchangeably by those skilled in the art of ionospheric study.

Figure 6:
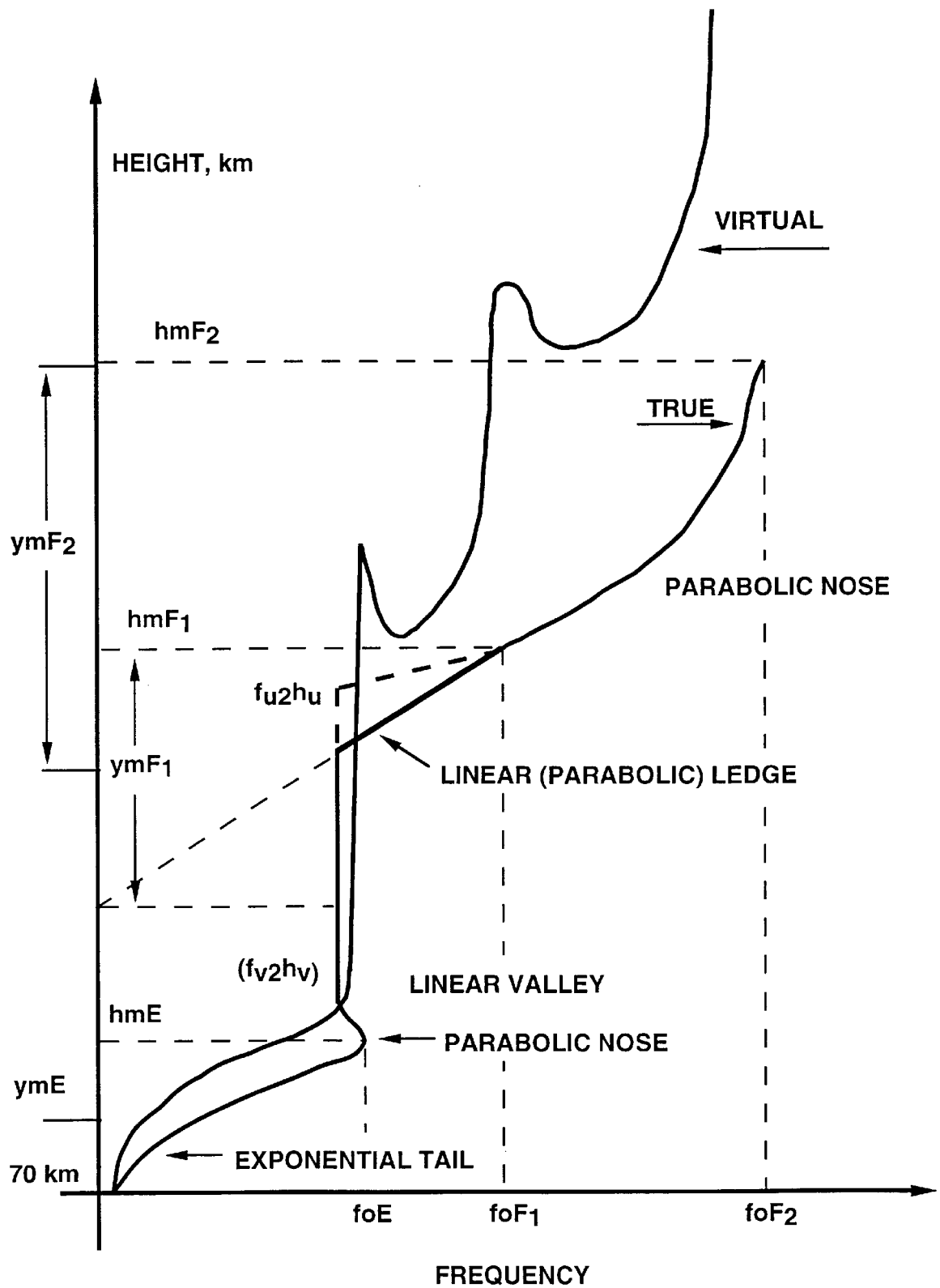
FIG. 6 shows ionospheric profiles for an ionospheric model, such as VOACAP.

To represent worldwide conditions, VOACAP employs a profile shape as shown in FIG. 6. While it may appear somewhat different from the examples shown in FIG. 5, it has a number of free parameters which enable it to be fit to the representative profiles rather well. There is a change in nomenclature which is related to the manner in which data is obtained as well as factors associated with the layer configurations. Vertical Incidence Sounders (VIS) measure so-called ordinary-ray critical frequencies for the various layers since those frequencies are related to the maximum electron density, Nmax, of the specified layers. The relationship is as follows: $Nmax=1.24 \times 10^{10} fo$ where Nmax is the maximum electron density (electrons/m3) and fo is the critical frequency (Mhz). A suffix is added to indicate the appropriate layer involved. The important critical frequencies exhibited in FIG. 6 are foE, foF1, and foF2 for the E, F1, and F2 layers respectively. The respective layer heights are: hmE, hmF1, and hmF2; the respective semi-thicknesses are: ymE, ymF1, and ymF2. Also depicted is a representative "virtual" height versus frequency curve, which is the corresponding ionogram for the ionospheric model displayed.

Another feature of climatological models is the data base formulation, and some form of mapping procedure. Mapping procedures are used to develop contours of electron density for various altitude regimes. A good reference is the CCIR Atlas of Ionospheric Coefficients. Many iterations of the method will be apparent to one of ordinary skill in the art. The original procedure of mapping was carried out by Jones and Gallet. Jones, W. B. and R. M. Gallet, 1962, "The Representation of the Diurnal and geographical Variations of Ionospheric Data by Numerical Methods", J. Res. Nat. Bur. Stds., Section D, 66D, pp. 419–438, which is herein incorporated by reference. In general, one preferred embodiment incorporates a 7th order Fourier analysis for each station yielding 15 coefficients per station. This multi-station representation of temporal behavior is then subjected to a Legendre analysis to yield the global patterns at geographical grid points. This enables maps to be developed.

All climatological models are empirical, since they are based on measured data. The data generally consists of vertical-incidence-ionograms which are amassed and analyzed for average or median characteristics. Unfortunately, ocean areas do not contribute to the worldwide data base in proportion to the amount of surface area they represent. This is because vertical-incidence-ionogram devices are largely ground-based, and only probe the ionosphere directly above the instrument. As a consequence, representation errors arise. Mapping methods are most stable when the data points are uniformly distributed, and this necessitates the "invention" of data points for areas with no data. These are sometimes referred to as phantom points, but their existence may be justified on the basis of a combination of theory and experience. The incorporation of extrapolation techniques using theoretical methods is quite useful, especially over ocean areas, where the data base is exceedingly sparse. Under the aegis of the International Union of Radio Science (URSI), this method has been explored in Rush, C. M., M. PoKempner, D. N. Anderson, F. G. Stewart, and R. Reasoner, 1984, "Maps of foF2 Derived from Observations and Theoretical Data", Radio Science, 19(4):1083–1097, which is herein incorporated by reference, to deduce an alternative set of ionospheric coefficients thought to be improvements over the originals. Both IONCAP and VOACAP use the original set of CCIR coefficients, but the alternative coefficients, called the URSI set, may be used as well.

Climatological models have a number of deficiencies. Most suggested improvements relate to methodologies for treatment of propagation effects, but there is also a need for better short-term forecasting or nowcasting. Specific features, such as sporadic E and Spread F are either imprecisely modeled or ignored in most models. The present invention includes methods developed to cope with these effects. Specifically, tilts and gradients need to be properly modeled. Macroscopic (large-area) tilts and the effects of the terminator need to be handled, and the tilts/gradients associated with the various circumpolar features must also be modeled. Finally gravity wave-induced Traveling Ionospheric Disturbances (TIDs) must also be modeled. The present invention fulfills these needs by providing a dynamic forecasting method. No baseline model described above can address these issues effectively. This is because the effects are driven by forces which are time-variable and unpredictable.

Figure 7:
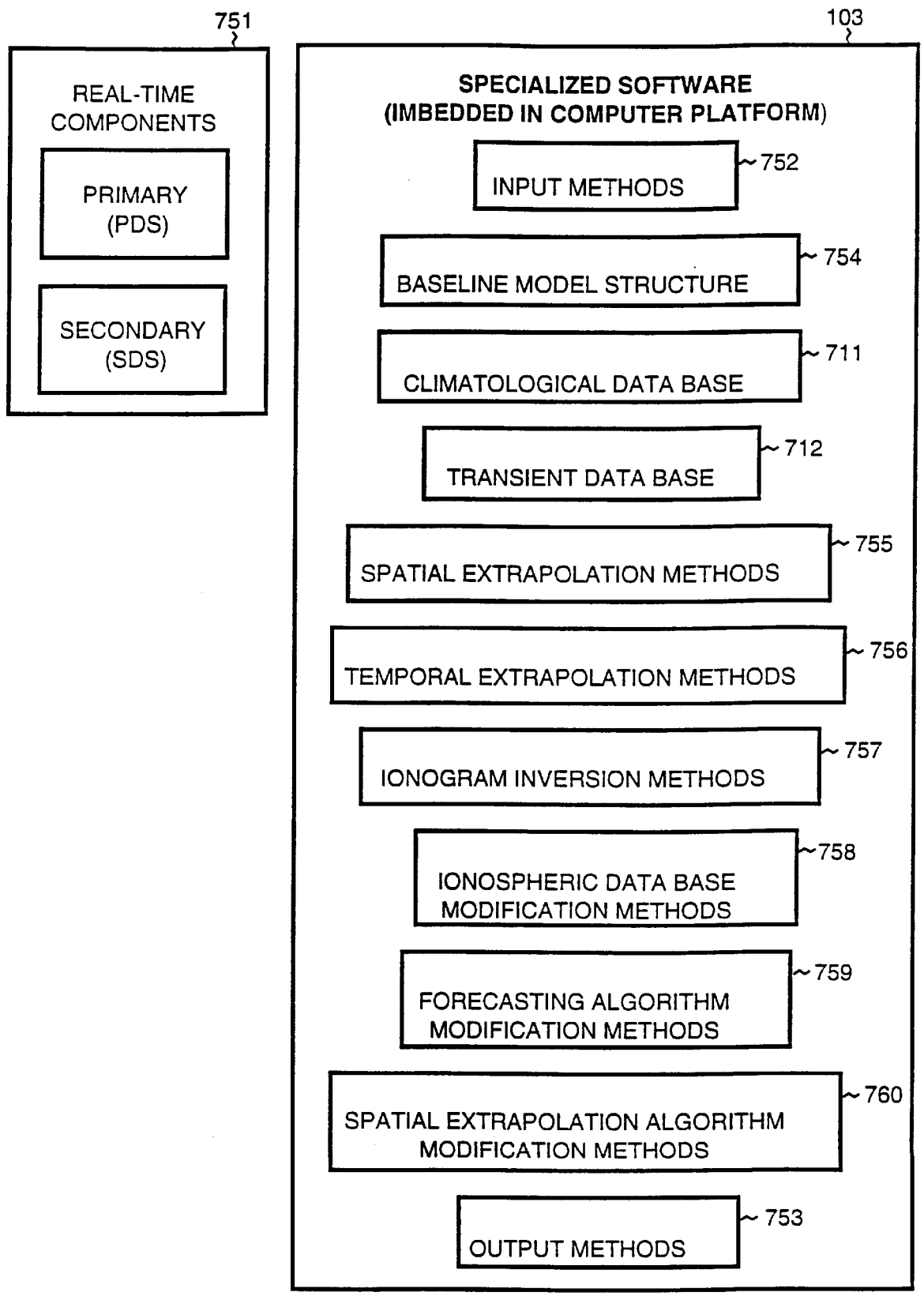
FIG. 7 is a block diagram illustrating individual software modules.
Figure 8A:
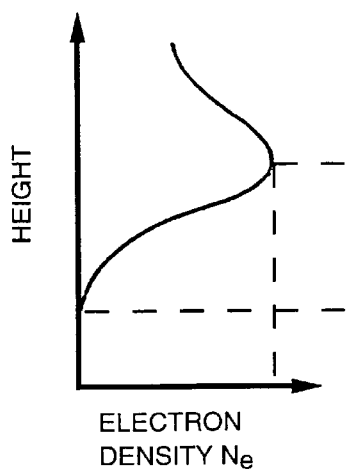
FIGS. 8A through 8E illustrate the difference between OIS and vertical-incidence-ionograms.
Figure 8B:
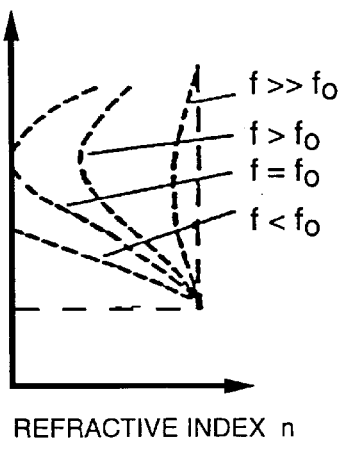
Figure 8C:
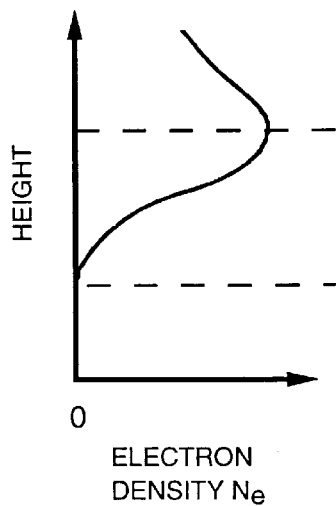
Figure 8:
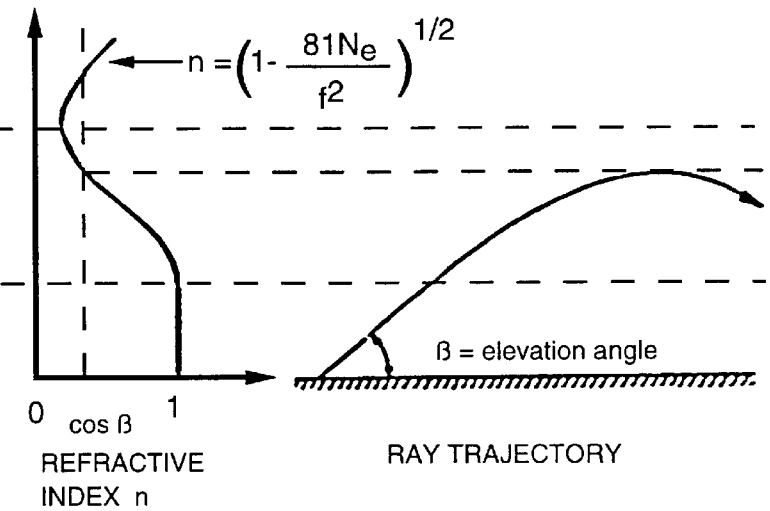

The present invention, provides an assembly of real-time components 51 to drive a set of specialized software 103 as shown in FIGS. 1 and 2. FIG. 7 is a block diagram illustrating the individual software modules. They include: input methods 752, output methods 753, a baseline model 754, a Climatological Data Base 711, a Transient data base 712, spatial extrapolation methods 755 which are contained in Dynacast real-time assessment system 208, temporal extrapolation methods 756 which are contained within Dynacast forecasting system 209, ionogram inversion methods 757, CDB modification methods 758, Forecasting algorithm modification methods 759 which lead to the Forecasting algorithm adjustments 216, and spatial extrapolation algorithm modification methods 760. These features distinguish Dynacast from VOACAP, which provides only a climatological (essentially median) representation of system performance. Dynacast generates near-real-time estimates of system performance (as well as underlying ionospheric parameters).

The input methods 752 are the specified ways in which data may be entered into the system, including keyboard and data port (i.e., RS-232, or IEEE-488), and the methods include the data format structures required. The output methods 753 depend upon selections of Dynacast applications products 214 or the default VOACAP outputs 215. The output methods lead to a set of tangible products embodied in Data sink module 217, as shown in FIG. 2.

The assembly of real-time components 751 consists of ionospheric sounders, including those which are fixed and those which are deployed on mobile platforms. These systems generate the primary data sets 101 as shown in FIGS. 1 and 2. The basic device is the Chirpsounder but its manifestation may take the form of ARCS on a mobile communication platform. This form of communication capability, involving automatic link establishment and link maintenance functions, belongs to a class of Automatic-Link-Establishment systems. It differs from other methods in that channel capacity is not sacrificed to accomplish the sounding function. The ARCS approach would enable land-based stations to request and gather transmission data from ships at sea. ARCS has been suggested as the basis for a worldwide ionospheric assessment system. See Goodman, J. M. and J. W. Ballard, August 1994, "A Comprehensive Ionospheric Assessment Campaign Based Upon a Vast Deployment of Oblique-Incidence-Sounder Receivers on Ships and Aircraft", BLOS Conference, sponsored by the Naval Security Group, hosted by Univ. Texas, Austin (which is herein incorporated by reference).

As described below, Dynacast, utilizes certain climatological communication models updated by suitable real-time sensor data to render the products useful for nowcasting and forecasting purposes. Although the primary sensor of choice in Dynacast is the Chirpsounder system, other real-time sensor data may be used as well. In particular, ALE system data is used in certain embodiments. Generally, any data source which contains information that may be used to approximate or derive any of the critical frequencies shown in FIG. 6 may be used.

ALE radios periodically sound over a set of channels to provide an active basis for evaluation of potential links between ALE stations at a specified set of frequencies. The duty cycle of the sounding within an ALE network varies, but sounding cycles may be prescribed at regular intervals. Moreover, the sounding frequencies are typically scattered across the HF band: 3–30 MHz. This range is dependent upon the radio service to be supported.

The ALE sounding waveform from multiple ALE radios may be used as a source of real-time data. By monitoring the Link Quality of the sounds which are received, along with the station ID (to establish the position of the fixed stations), it is possible to update a climatological model in a manner similar to updating done using sounder data. A first technique is to assess the observable least upper bound (lub) of non-propagating frequencies for each identified and localized ALE radio. The lub is compared to the observable greatest lower bound (glb) of propagating frequencies. A semi-empirical relationship is used to deduce the Maximum Observable Frequency (MOF) from the glb and lub data. In one embodiment, the lub is simply used as an approximation of the MOF. From this information, as is described below, MOF/MUF ratios may be deduced, layer multipliers calculated, and other factors which will be used to deduce ionospheric parameters for insertion in the ionospheric sub-model which is contained within the basic communication model are derived.

The ionospheric data obtained in this way provides F2 layer -driven parameters. Similarly, another scheme for updating at the lower part of the propagation window is also used to update the LOF for each path of interest.

The specialized software module is the basis for modifying the underlying ionospheric coefficients and the ionospheric layer parameters as well as the geographical domain over which such modifications are made. The domain of definition is established by the constellation of sounders, since the sounders determine the spacing of the ionospheric control points which are significant in the domain specification analysis.

A control point is taken to be the midpath point for a specified 1-hop ray trajectory, since most of the refraction and ionospheric interaction takes place near the apogee of the ray trajectory. Multiple control points occur if an HF signal undergoes multiple hops when propagating between two terminals. This aspect may be determined from the Chirpsounder ionograms and geometrical analysis. Ionospheric characterization is best if the distance between control points is such that some residual correlation exists in the variability which may be attributed to the control points under test. Ideally the spacing is such that the correlation never falls below 0.7 so that extrapolation methods will provide at least a 50% improvement over static models between control points. It has been shown that a correlation of 0.9 corresponds to horizontal distance of 700 km for middle latitudes. See Daehler, M. 1984, "An HF Communications Frequency Management Procedure for Forecasting the Frequency of Optimum Transmission", Memo Report 5505, Naval Research Laboratory, Washington, D.C. which is herein incorporated by reference.

Variations are evidenced during highly disturbed periods when correlation distances may either shorten or lengthen. A lengthening may arise in the presence of mesoscale variations in the F-layer electron concentration such as those which occur during ionospheric storms. These include the well-known MOF-diminutions which cause the so-called MUF-failure events. A shortening in the correlation distance may arise as a result of the presence of traveling-ionospheric-disturbances (TIDs) and other magnetic sub-storm events which generate intermediate scale irregularities. Correlation may also be reduced across the day-night terminator and across boundaries separating geophysical regimes. These features are contained within the spatial extrapolation methods module 755. The present invention also provides methods for spatial extrapolation algorithmic modification 760.

The present invention, in its embodiments, includes methods of adapting the mapping technique based on the correlation distances of the points. For example, a Service Region may be specified which is bounded between 50 to 70 degrees N latitude and 20 to 60 degrees W longitude. The default size of a Dynacast Resolution Cell may be specified as 5 degrees×5 degrees, a dimension over which correlation between adjacent samples begins to fall off rapidly under most conditions. The Resolution Cell may be altered based upon an external parameter such as magnetic Kp, or through analysis of real-time Chirpsounder data. Over the entire bounded region specified above, a 5×5 degree Resolution Cell dimension would correspond to 32 Resolution Cells.

The Resolution Cells may be sequenced from East to West, proceeding from the most poleward row, then descending equator-ward. The coordinates for the centroid of each Resolution Cell are defined. Dynacast is then executed for each Resolution Cell centroid. The ionospheric properties at each centroid are computed, based on the multiple Resolution Cell records. The Chirpsounder data is referenced to a large number of oblique ray trajectories and the midpoints of the separate single-hop trajectories are the Control Points. If there are 4 Chirpsounder transmitters essentially bounding the service region, and there are 320 platforms, then there are 4×320=1280 Control Points. These Control Points will be included in the 32 Resolution Cells defined in this example. If they were evenly distributed, there would be 40 points in each Resolution Cell. In general this will not be the case.

The Resolution Cells expand and contract as necessary, based upon Chirpsounder data. Based upon the initial set up procedure, the Resolution Cell dimension was defined based on the expectation that there exists a degree of correlation between all points within the Resolution Cell. With 40 points in each cell, this hypothesis may be tested. If the correlation is high, the Resolution Cell dimension may be increased; if it is low, the Resolution Cell dimension may be decreased.

If the correlation is sufficiently high within the Resolution Cell, there is also the option of using the redundancy to excise "outlyers" or to provide smoother estimates to be assigned to the centroid. Making the process adaptive enables the minimum essential computation to be exercised in the mapping procedure.

Another option allows for a comparison of climatology with the real-time Chirpsounder-derived data to be made over the specified Resolution Cells. Under some conditions, the distinction between climatology and Chirpsounder assessment may only be a bias term. If the same bias term exists over a number of contiguous Resolution Cells, then bias-corrected climatological maps may be used as replacements for Chirpsounder-derived maps over the expanded zone of Resolution Cells. In the limit, an entire Service Region could be defined as a single Resolution Cell under very benign conditions. At the other extreme, the Resolution Cell dimension may be as small as 1×1 degree, and there may be little or no relationship between climatology and real-time Chirpsounder data over the Resolution Cells.

A corollary method to the above relates specifically to the situation for which an analyst may wish to specify propagation conditions directly, without the additional step of centroiding ionospheric data at the ray trajectory Control Points. In this case, a single Service Provider or Chirpsounder transmitter is specified to serve a specified region bounded by two great circle paths terminating at the Service Provider and two ranges from the Service Provider. In a manner similar to the definition of the Resolution Cells defined above, a default cell dimension is selected. The cells in this instance will be identified and reckoned in range-bearing coordinates. The process of adaptivity is basically the same. Under benign conditions, or other conditions for which ionospheric variability is limited over a large area, the system manager for Dynacast may opt to increase the size of the resolution cells or it may be carried out under software control. In this situation the ionospheric information at the centroid of the cell is deemed to apply to a wide area. This suggests that the propagation assessment over the resolution cell will be very slowly-varying, with the variation largely attributed to changes in solar zenith angle (i.e., local time) and path difference from the centroid and the platform to be serviced.

One embodiment of the invention enables the ionospheric coefficients which characterize the baseline model to be modified, thereby providing a time-varying baseline ionospheric description, one which is defined by learned behavior provided through data from ARCS technology or other data extracted from Chirpsounders. This method introduces some flexibility into the baseline model, which makes the default description of the ionosphere (i.e., one with update sources turned off) more accurate for the time period of interest. The current invention replaces a zeroth-order static model by a first-order model which accounts for biases which occur in the data base which defines the baseline model. This process occurs over time as the properties of the ionosphere are learned by the system. Over land areas where the baseline model is most accurate, it is anticipated that the variance between the zeroth-order and first-order descriptions will be small. Over ocean areas, the baseline model is least accurate since the data which was used to develop the baseline model is quite sparse. The present invention will improve the zeroth-order model description as the system learns the properties of the ionosphere over oceanic areas and makes necessary bias adjustments. This data may be used to improve the understanding of the lower ionosphere over oceanic domains where fewer measurements are made in the course of developing the model. The current invention provides data over oceanic zones not accessed by other methods because it uses data from measuring the ionosphere obliquely at or near ionospheric reflection points on control points. The process by which the Climatological Data Base 11 is modified to produce a Transient Data Base 12 is contained within the software module called Ionospheric Data Base Modification Methods 58.

The results from the climatological model are modified according to the real time data. In one embodiment, the VOACAP MUF is forced to equal the Dynacast MOF at the centroid, thereby developing a pseudoflux for the F2 region alone. In certain embodiments, an alternative scheme is used wherein the F2 layer critical frequency (i.e., foF2) at the sounder control point is modified based on the ratio of MOF to MUF, where the ratio is called an F2 layer multiplier. Thus the new foF2=(MOF/MUF) * (old foF2). The new value of foF2 so obtained is then extrapolated to the required position as above. Although this alternative procedure involves the development of an ionospheric layer multiplier rather than a pseudoflux, it belongs to the class of Limited Pseudoflux Methods (LPMs) since the solution is restricted to the F2 layer. Similar methods are used for each of the other ionospheric layers in certain embodiments. Points are extrapolated to the new position and local time (i.e., not the UT, which is fixed) using the usual VOACAP rules. The limited pseudoflux scheme is used, and the sporadic E is accounted for independently. This process is adaptive and reduces the data processing burden significantly.

FIGS. 8A through 8E illustrate the difference between OIS and vertical-incidence-ionograms. The relationships between ray path, refractive index, and electron density are shown. In the depiction, it is assumed that only a single layer is involved. The ordinary ray critical frequency of the layer is taken to be fo. The distinctions are derived from magnetoionic theory which is well established. A detailed description may be found in Davies, K., 1965, Ionospheric Radio Propagation, Monograph 80, NBS, Dept. of Commerce which is herein incorporated by reference. For the vertical incidence case (FIGS. 8A and 8B), the ionosphere may be penetrated if the sounder frequency exceeds fo. It is noted for oblique sounding (FIGS. 8C–8E), that a range of frequencies in excess of fo will be reflected from the ionosphere and returned to earth. As the elevation angle is reduced, the radio wave is reflected at greater distances from the sounder transmitter until an upper limit in the frequency which will be successfully reflected is approached. The reflection height (i.e., the apogee of the ray trajectory) is determined by the elevation angle shown in FIG. 8E and the electron density profile shown in FIG. 8D. This reflection height for oblique trajectories is well below the peak height of the layer, hmF2.

Vertical-Incidence-Sounders, of the type which were used to produce the zeroth-order model, do not provide a sufficient number of samples over oceanic areas since there have been very few if any vertical-incidence-ionogram stations set up to provide synoptic data of relevance to oceanic environments. Moreover there is only one spatial sample afforded per vertical-incidence-ionogram instrument. On the other hand, for N Chirpsounder transmitter-receiver pairs, there are N(N−1)/2 paths, each one of which may be sampled bidirectionally. An advantage of the preferred embodiment is the fact that ocean areas are accessible. This enables the system to learn the ionosphere and HF propagation conditions over areas for which data was not available when the baseline model was developed.

The preferred embodiment includes the development of a first order correction to a zeroth order baseline model, such as IONCAP or a similar code. Other real-time corrections of second and third order are also possible. The preferred embodiment uses VOACAP as the baseline model. Second order corrections may include modifications in ionospheric profile shape over the regions being sampled based upon a network of fixed Chirpsounder assets which span the oceanic regions. Third order corrections may be based on selected data derived from ARCS units installed aboard mobile platforms (viz., aircraft and ships). The data used includes critical parameters derived from Chirpsounder ionograms.

Figure 9:
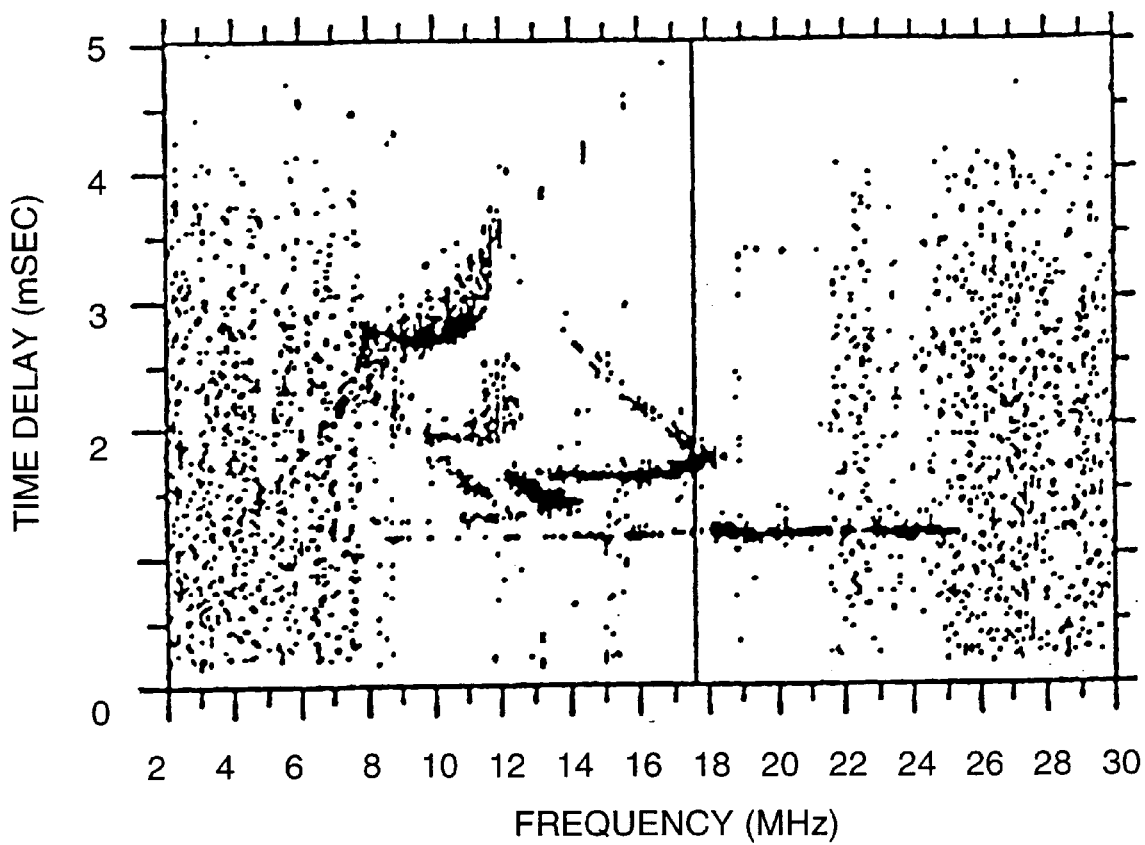
FIG. 9 is graph illustrating a sample ionogram.

Chirpsounder ionograms are presentations of signal presence on a grid of frequency (x-axis) and time delay (y-axis). The ionogram indicates the group path time delay to transit the distance between the transmitter and receiver terminals as a function of frequency. At a given frequency, there may be several distinct time delays or there may be a spread of time delays. The character of the time delay pattern is an important aspect in the frequency selection process. Generally, it is preferable to operate in frequency domains for which the time delay function is single valued, as this indicates that intersymbol interference will not be a problem, and capacity will not be sapped for compensation (i.e., error correction coding and/or redundancy application). FIG. 9 is graph illustrating a sample ionogram. The graph indicates that there are several ionospheric layers involved. There are also multiple hops, with three being observed. As the Chirpsounder sweeps from the lowest to the highest frequency, the time delay associated with various reflected signals varies. There is also a lowest observable frequency and a highest observable or maximum frequency. These are referred to as the LOF and MOF, respectively. From an operational point of view, the absolute MOF is most important since it indicates the instantaneous upper limit of propagation frequencies for the path being sounded. From a forecasting point of view and for use in extrapolation to unsounded paths, it is important to distinguish between the absolute MOF and the layer-specific MOFs. For example, FIG. 9 has an absolute MOF of 25 Mhz attributable to sporadic E and an F-layer MOF of about 18 Mhz. Sporadic E has a spatial correlation far less than the F-layer, and this is important in the prediction scheme. Consequently, in one embodiment, Dynacast tracks both the sporadic E MOF and the F2-layer MOF. In general, Dynacast may provide estimates of MOFs for all layers, including the normal E layer and the F1 layer which are generally derived from Chapman layer assumptions.

As just indicated, the critical parameters derived from the Chirpsounder ionograms include the maximum observable frequency (MOF) and the lowest observable frequency (LOF). Other parameters may include: signal quality measures, multipath spreads, and Signal-to-Noise ratios at selected frequencies. Full ionograms are not returned from the mobile platform in the preferred embodiment, although it is certainly not precluded. The data is returned to control stations over a data communication link or orderwire. It is a feature of Dynacast that communication data in different forms is used to update the real-time ionospheric model, depending on what data is available. Individual parameters such as the MOF, LOF, lub, glb are used, as well as full ionograms.

On a coarse time scale and over a period of time during which many measurements are made, the system learns the ionosphere and alters the fundamental makeup of the coefficients which are the basis for the static or zeroth-order model. This produces a more realistic zeroth-order description of the ionosphere. As noted above, the process is especially important over oceanic regions for which the baseline description, the modeled median, may differ from the actual median by a significant amount. This feature of the invention enables the default ionosphere (i.e., an ionosphere which must be utilized in the absence of updates) to be more representative. The median values of specified parameters such as foF2 and hF2, parameters which are fundamental in the estimation of the Maximum Useable Frequency (MUF), are modified based on observations of the ionosphere.

As defined earlier, the parameter foF2 is the critical frequency of the F2 layer. It is related to the electron density N by the formula:

$$N = 1.24 \times 10^{10} \, (foF2)^2$$

where N is in units of electrons/m3 and FoF2 is in Mhz. The critical frequency is the highest frequency that will be reflected by the ionosphere when the radiowave is at vertical incidence with it. A simple (but crude) recipe for obtaining the MOF for a path may be obtained if the ray elevation angle E is established and FoF2 is given:

$$MOF = foF2 \, \sec(90° - E).$$

A more complex relationship is needed for a curved earth, and ionospheric tilts will cause the method to be inaccurate. For this reason, certain embodiments do not use vertical-incidence-ionogram data. Direct measurements of the MOF from OIS data is used instead. The parameter hF2 corresponds to the height of the F2 layer. It is a critical parameter since higher values generate lower MOFs and vice versa. This is because the elevation angle is an increasing function of hF2 if the propagation path is fixed. The median value of the MOF as normalized by foF2 is directly related to the height of the layer as represented by the Shimazaki equation described in Shimazaki, T., 1955, "Worldwide Daily Variations in the Height of the F2 Maximum Electron density of the Ionospheric F2 Layer", J. Radio. Res. Labs., Japan, 2(7)86–97, which is herein incorporated by reference.

On a shorter time scale, the preferred embodiment corrects the median properties represented by the new first-order description, using ARCS technology in real-time, a process which transforms (statistical) median values into (deterministic) current values. These values from a variety of platforms are assimilated and organized by the Dynacast computer. A time-varying contour map of the ionosphere is developed, portions of which are utilized to estimate propagation conditions for arbitrary circuits over the region for which the revised ionospheric map is applicable. The focus is on HF assessment and short-term forecasting, but this does not limit the application suite. A contour map is also provided in certain embodiments.

In one embodiment, Chirpsounder-derived ionospheric profiles including height parameters as well as critical frequencies or electron densities are exploited. In this embodiment, the profiles are developed from established fixed Chirpsounder terminals which more conveniently preserve absolute time records, a fact which allows the unequivocal determination of layer heights as well as the maximum electron densities associated with the various layers. This process may be invoked over a relatively sparse network and with a reduced duty cycle to reduce computational loading and to take advantage of the fact that height information is expected to be more slowly-varying than critical frequency information.

Figure 10:
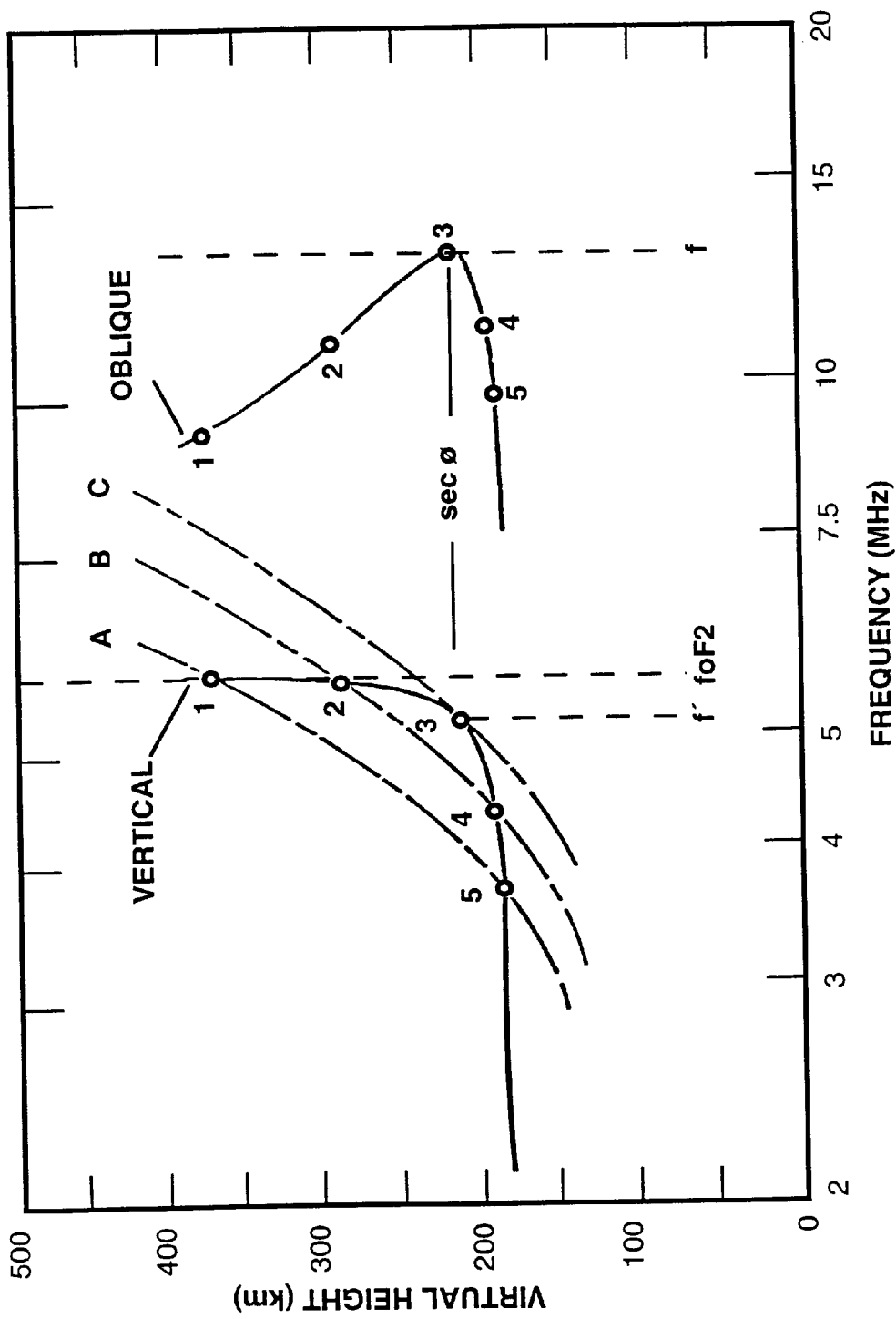
FIG. 10 is a depiction of the inversion process implemented in one preferred embodiment for which accurate layer height information and mode identification is critical.

The inversion of an ionogram is the process by which a display of time-delay vs. frequency is converted to a profile of electron density vs height. In other words, T(f), the time delay as a function of frequency, is converted to N(h), the electron density as a function of height. This is a well established method for vertical-incidence-ionogram and OIS data. This method is explained in more detail in Titheridge, J. E., 1985, "Ionogram Analysis with the Generalized Program POLAN", Report UAG-93, World Data Center for Solar-Terrestrial Physics, NGDC, NOAA, Boulder Colo., which is herein incorporated by reference. FIG. 10 is a depiction of the inversion process implemented in one preferred embodiment for which accurate layer height information and mode identification is critical. Other embodiments do not include analytical inversion features.

Figure 11:
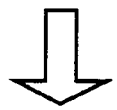
FIG. 11 is a diagram which outlines the analytical procedure involved, and the fundamental SP-LPM process which takes a single measurement of the MOF and converts it to a pseudoflux.
Figure 11:
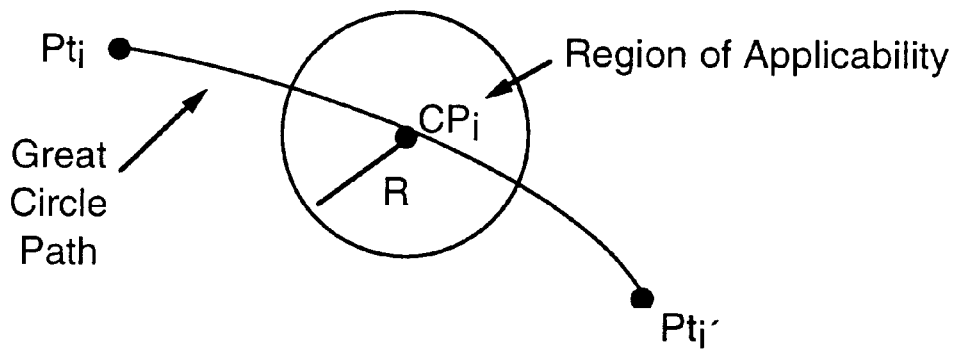

An hierarchy of update schemes of varying complexity may be used. These are provided as options, and selection is dependent upon speed and accuracy requirements. These are referred to collectively as Limited Pseudoflux Methods (LPMs) which have several manifestations: the single-point Limited Pseudoflux Method, the area-averaged Limited Pseudoflux Method, and contour-capable Limited Pseudoflux Method. FIG. 11 is a diagram which outlines the analytical procedure involved, and the fundamental SP-LPM process which takes a single measurement of the MOF and converts it to an "effective sunspot number", called a pseudoflux (F). The pseudoflux which corresponds to an observed MOF is used as an input to the climatological model, replacing the actual sunspot number. In certain embodiments, an LPM method is used so that a pseusoflux is only used to update the model for a certain specific layer or layers. This is desirable during periods when changes to a portion of the ionosphere do not correlate well with changes in other layers. In one embodiment, only the F2 layer is modeled. In other embodiments, the sporadic E layer is separately modeled. It should also be noted that, although the exercise of determining a pseudoflux is described herein, it is also possible to adjust the critical frequency and/or the height parameters of an ionospheric model as shown in FIG. 6 directly, without determining a pseudoflux.

As noted above, the Limited Pseudoflux Method is a method for updating the deliverables in the baseline model. Suppose the deliverable is the MUF, or maximum usable frequency. This is a statistical median and is not very useful for real-time applications. With ARCS, the MOF, or maximum observable frequency may be deduced. The baseline model is parameterized by a sunspot number or solar flux quantity, a parameter which is well accessible as an input. Generally, higher values of sunspot number imply higher values of MUF, and vice versa. It is possible to force the MUF, even though it is fundamentally a statistical parameter, to agree with an observed MOF. The sunspot number which corresponds to a coincidence of the MOF and the MUF is termed the pseudoflux since it no longer has the same physical significance as sunspot number. It is simply the (sunspot) index which makes the baseline model agree with the ARCS-based measurements. It should be noted that all layers in the ionosphere are modified by sunspot number variations. Without restriction, the pseudoflux determination recipe would cause all layers of the ionosphere to be modified, whereas only the F2 layer is subject to the kind of variability which should be accounted for in the manner described.

Figure 12:
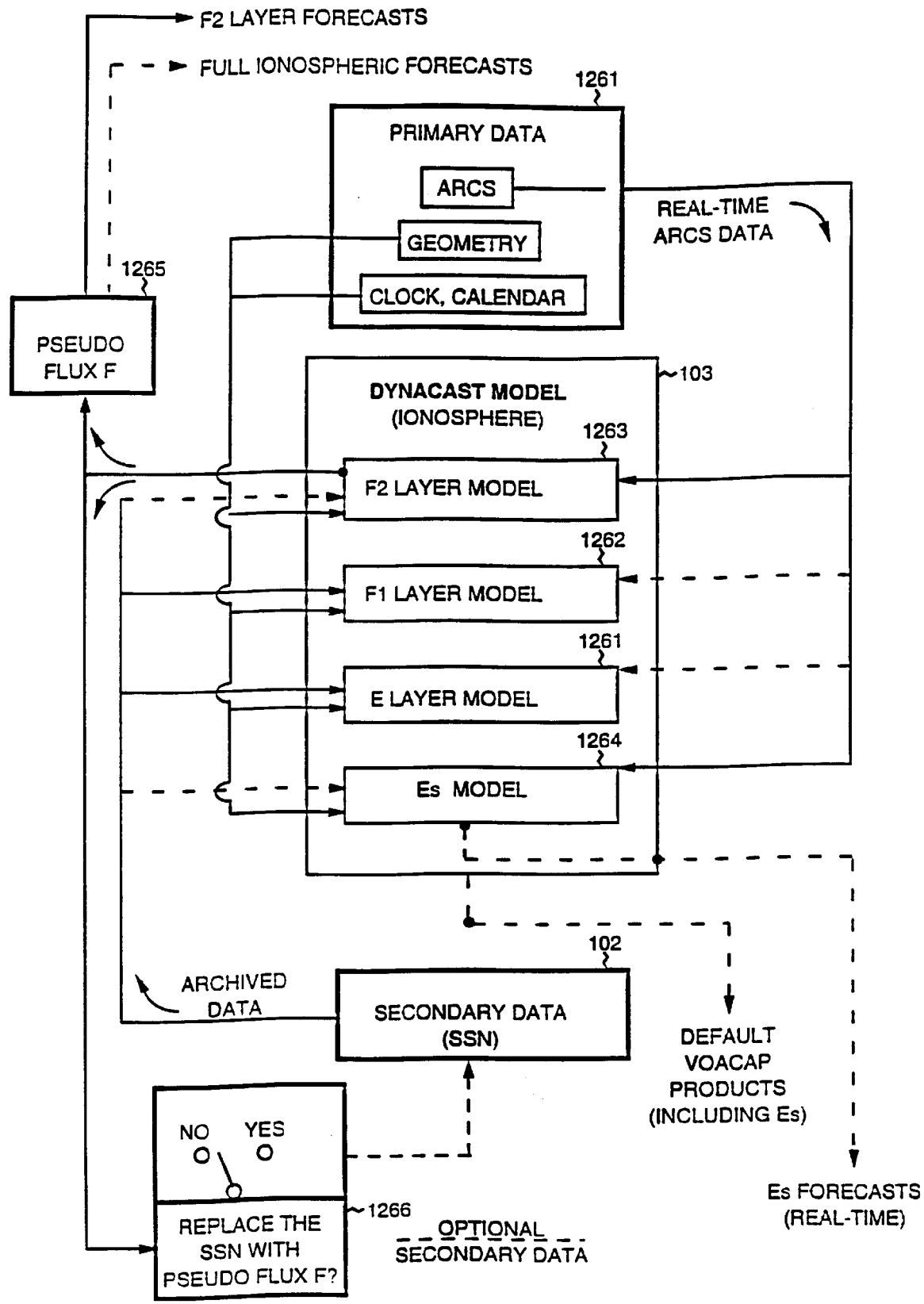
FIG. 12 is a block diagram illustrating the model updating system.

FIG. 12 is a block diagram illustrating the model updating system. Primary data 101 and secondary data 102 are used to update a Dynacast ionospheric model 1200. When the Limited Pseudoflux Method is used, a set of individual layer sub-models, including E-layer model 1261, F1-layer model 1262, F2-layer model 1263, and the Es-layer model 1364 are emphasized. A pseudoflux, F 1265 is generated, which may be exploited for F2-layer assessments and forecasts or for predictions of the full ionosphere. The SSN is replaced by the pseudoflux, according to user specified choice 1266.

Another embodiment of the LPM is one in which allowance is made to modify the modeled F2 layer critical frequency (i.e., FoF2) in proportion to the ratio of the (measured) MOF to the (predicted) MUF. This approach attributes all MOF variability to variability in foF2 and ignores variability in the F2 layer height (hF2), or equivalently the secant factor in the formula:

$$MOF = foF2 \, \sec(90°-E).$$

This method, called the multiplier method, is correct to the first order for many HF paths and its implementation provides a useful compromise between accuracy and complexity in a number of applications. Having deduced a new value for foF2 based upon observation, MOFs may then be computed for arbitrary paths. The condition for success of this approximate method is that height variability is not important and that foF2 is highly correlated over the region for which MOFs are to be deduced.

The pseudoflux scheme is limited to only the F2 layer, and the 12-month running mean sunspot number, SSN, controls the behavior of the underlying "regular" layers such as F1 and E. These layers are decidedly Chapman-like in nature and are generally well described by the usual sunspot number dependence.

A Chapman-like layer is one which has properties as defined in Chapman theory. A fundamental Chapman prediction is that higher electron densities always occur when the sun is at a higher elevation. Chapman, S., 1931, "The Absorption and Dissociative or Ionizing Effect of Monochromatic Radiation in an Atmosphere on a Rotating Earth", Proc. Phys. Soc., 43: 26, describes this in more detail. Since the current method treats the F2 layer by a pseudoflux scheme and the F1 and E layers by the sunspot number scheme, it is referred to as the Limited Pseudoflux Method or LPM.

There are other manifestations of the Limited Pseudoflux Method. The basic Limited Pseudoflux Method is applicable for data extracted over a single path, and at one control point. If ionospheric corrections for a single path only as developed, the method is the single point, or SP-LPM, as outlined in FIG. 11. The SP-LPM method is fundamental, and may be applied to the evaluation of the ionosphere over an expanded region, or globally. The SP-LPM has limited application if it is restricted to the control point, and it may introduce significant errors for paths far removed from the control point. The SP-LPM will therefore generally be used in the context of a finite region around the control point. In its simplest form, the region may be taken to be a circle of radius R. The dimension of this circular region is variable and is dependent upon the control point location, the actual solar flux (or sunspot number) and the magnetic activity levels. A default value is pre-specified for each major geophysical region (i.e., polar, auroral, midlatitude, and equatorial), solar activity level, and magnetic activity level. While R is highly variable, a typical value for R is about 500 km, where the control point is defined as the center of the region. In a generalized treatment, the region of applicability of the SP-Limited Pseudoflux Method may be an ellipse with the semi-major axis along the East-West direction and the semi-minor axis along the North-South direction.

A contour-capable method, or CC-LPM is invoked when there are sufficient samples such that pseudoflux contours may be developed. These pseudoflux contours are used as an overlay which is convolved with the zeroth (or first-order) models to derive the real-time ionosphere, contours. It is important to be able to smooth the corrections deduced from the complement of Limited Pseudoflux Methods such that they do not introduce unrealistic values or discontinuities in the transition region within which real-time corrections should default to climatology because of insufficient data, and values extracted from the baseline model are used. One embodiment reckons borders of the ionospheric map, especially that portion over which real-time corrections should merge with climatology, based upon a correlation distance d, a parameter which is defined by the correlation of ionospheric variability. It is generally a function of a number of factors; d=d(t, R, S, Ap) where t is local time, R is the geophysical regime, S is the solar epoch, and Ap is the magnetic activity. A first order treatment takes d to be fixed. It is possible to evaluate d over time to arrive at more precise values using assets associated with the system.

Figure 13A:
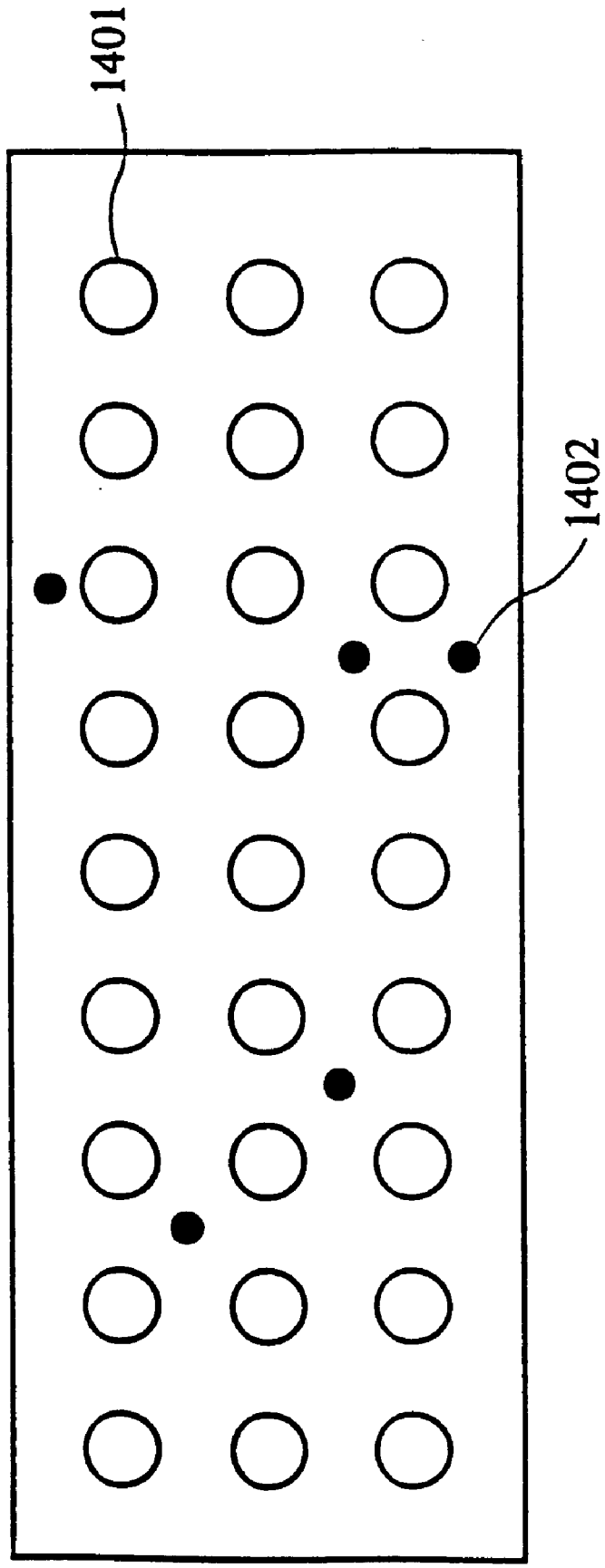
FIG. 13A is a diagram illustrating grid control points and sounder control points that provide real-time updates for a climatological model used in one embodiment.

FIG. 13A is a diagram illustrating grid control points and sounder control points that provide real-time updates for a climatological model used in one embodiment. Grid control points 1401 are evenly spaced so as to provide a map of critical frequencies as predicted from a climatological model and updated using real time data such as sounder data or data from ALE systems. Sounder control points 1402 are un Although sounder represent real time data. Although sounder control points are used for the purpose of the discussion below, any type of real time data that represents an empirical critical frequency for a layer of interest can be used. Each sounder control point is used to derive a multiplier that is used to adjust the critical frequency at the grid control points. The distance from each sounder control point to each grid control point determines the weight of the effect that the sounder control point has on the grid control point. In certain embodiments, the effect of distance is adjusted according to a correlation distance that determines the extent to which changes at a measured point correspond to changes at grid control points. The sum of the influences of all the sounder control point derived multipliers determines the adjustment to the model at each control point. In different embodiments, different critical frequencies are modified according to the model. In one embodiment, only the F2 critical frequency is adjusted. In other embodiments, other layers such as sporadic E are adjusted as well.

Figure 13B:
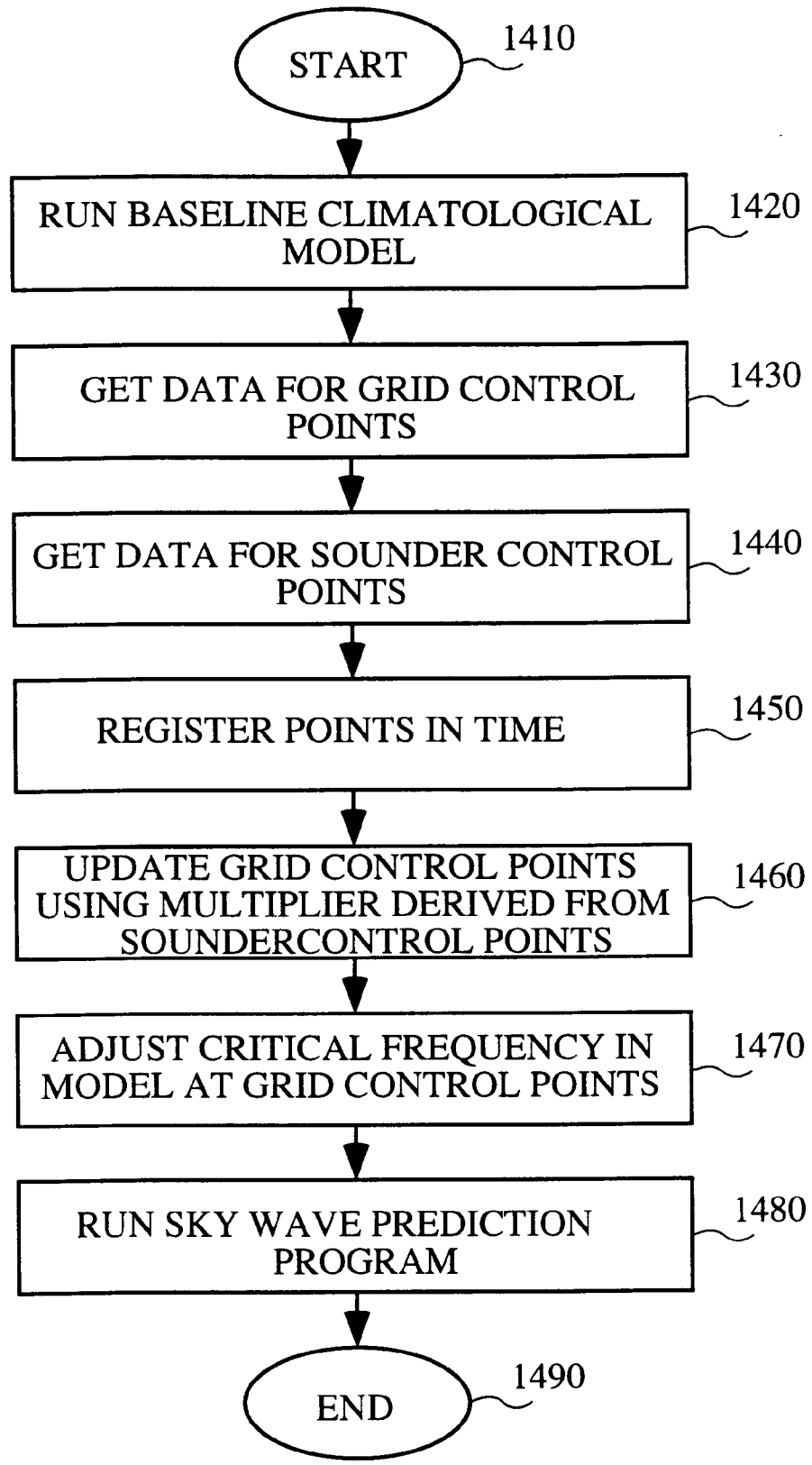
FIG. 13B is a process flow diagram illustrating the process for adjusting a critical frequency for a set of grid control points and using the adjusted values to predict communication performance.

FIG. 13B is a process flow diagram illustrating the process for adjusting a critical frequency for a set of grid control points and using the adjusted values to predict communication performance. The process starts at 1410. In a step 1420, a climatological model is run. In a step 1430, the grid control point critical frequency values are determined using the model. In a step 1440, sounder control points are obtained. Next, in a step 1450, the points are registered in time so that the value of the points at a single time is used. In some embodiments, this step may be skipped and sounder control points from different times may be used. In a step 1460, the grid control points are updated using multipliers derived from the sounder control points. The change at each grid control point is the result of the sum of the effects of all of the sounder points. One method of doing this is described below. In a step 1470, the critical frequency of the model is adjusted at the grid control points,, as is described in more detail below. In a step 1480, a skywave prediction program is used to predict communication performance and the process ends in a step 1490.

In one embodiment, a method is provided for extrapolation of LPM values, including multipliers derived through a comparison of Chirpsounder MOFs with VOACAP MUFs, so that useful information may be developed at arbitrary points in space and time. Different data sources may be used in connection with the present invention. In the embodiment shown, the MOF is used to derive a multiplier that adjusts the model. In other embodiments, other information is used similar to the MOF. In embodiments where data from ALE systems is used, for example, the glb is used as an approximation of the MOF. Thus, one advantage of the multiplier method described above is that it is flexible and able to use various kinds of data that may be available at different times to adjust the model.

The first step is to register each control point in time. Since Chirpsounder data are not all recorded at a given time during an hour, but are distributed, and it is desired to maximize the number of data points considered for a specified snapshot of the ionosphere, a rule for registration of control point information at any arbitrary point in time is used. The existing temporal gradient data embodied in the baseline ionosphere is exploited. The application of median gradients is used for short time periods between an actual sample time and the snapshot reckoning time. Usually this time is less than ½ hour but may be higher as ambient conditions may dictate. During chaotic periods a combination of median gradients and observed data trends can be used. As the environment becomes more unstable, exclusive use of observed trend lines may be used for the purpose of temporal registration. Using this hybrid technique, a maximum set of multipliers is obtained at a given time.

The next step is to exploit the multipliers set at the sounder control points (SCPs) to derive a new multiplier set defined at the grid control points. (GCPs). For ionospheric mapping, the GCP array may be uniform in space over a defined region for a communications problem, the customer may require data at a limited number of paths which are irregularly-spaced. These points may be obtained from the data in the GCP array using spatial extrapolation.

We define $\{p_i\}$ and $\{q_j\}$ as the ensembles of GCPs and SCPs respectively. These ensembles will in general exhibit no one-to-one correspondence. M $(p_i\ q_j\ t_k)$ be the multiplier at the CCP (labeled $p_i$) resulting from the influence of the multiplier M $(q_j\ t_k)$ at the SCP (labeled $q_j$) and a time $t_k$.

Then we have $$M(p_i q_j t_k) = 1 + [M(q_j t_k) - 1] \exp(-k d_{ij}) \qquad (1)$$

where dij is the great circle distance between pi and qj and $K=1/\delta$ where $\delta$ is the $e^{-1}$ distance. The M(qj, $t_k$) values are measured and have all been registered at the time $t_k$ on the basis of the temporal extrapolation procedure described above $\delta$ in general is a range of values depending on the disturbance indices (i.e. sunspot number and magnetic activity index), and the geographical region containing the control points of interest. For example, at mid latitudes we may take $\delta=1000$ km as a test value. Thus K≈0.001/km.

Next, the integrated influence of multiple control points on a specified CCP is calculated. Letting corner brackets (i.e., <>) imply an average over all SCPs (that is, all qj) we have:

$$\langle M(p_i t_k)\rangle = \frac{\sum_j \exp(-kd_{ij}) \cdot M(p_i q_j t_k)}{\sum_j \exp(-kd_{ij})} \quad (2)$$

Combining equations 1 and 2 we have $$\langle M(p_i t_k)\rangle = 1 + \frac{\sum_j \Delta M(q_i t_k)\exp(-2kd_{ij})}{\sum_j e^{-kd_{ij}}} \quad (3)$$

where ΔM is the departure of M($g_j$, $t_k$) from unity.

In the manner thus described, a procedure for both temporal registration and spatial extrapolation of measured data for use in updating a real time map is shown. There is no inherent restriction ion the array size or distributions for the points. For communication customers, the data provided may be limited and irregularly spaced. For customers requiring maps of ionospheric parameters the distribution of GCPs will be based upon the resolution required. In certain embodiments, efficient methods are used to handle situations in which the data sampling is redundant in one portion of a region but sparse in other portion. Prohibition of relative oversampling is a achieved through a process of centering data within preselected correlation distances. Redundant data is averaged and then the average is only counted once. The above described method thus exploits real-time data points as they are available in an efficient manner.

As indicated previously, certain embodiments accept a Chapman-like basis for the normal E-layer and F1 layers. The primary improvement is in the area of profile characteristics in such embodiments is the assessment of F2 layer variability and the assessment of sporadic E in real time. Neither the F2 layer nor the sporadic E layers are well represented in the Chapman theory. The departures in height, semithickness, and critical frequency for these two layers is thus accounted for without disturbing the model for the more Chapman-like layers. The correction corresponds to a direct replacement of modeled values with assessed values.

Mapping methods familiar to those skilled in the art are used in connection with the present invention. This is a matter of fitting contours of specified parameters over a geographical grid. The ionosonde parameters to be contoured include: FoF2, hF2, foF1, hF1, foE, hE, foEs, and hEs. Other parameters which are candidates for mapping include: pseudoflux, multipath spread, and signal quality as a function of frequency selection.

Dynacast operation is driven dynamically based upon input data sets, some elements of which are actively monitored for changes. Fixed data sets include information associated with fixed assets, Chirpsounder/ARCS sites, service providers, etc. The current and projected positions of platforms is maintained. Other updated input data may include the Chirpsounder propagation data; i.e., the MOFs, LOFs, multipath spread index, EsMOF, channel quality indices, etc. These are determined from data extracted from the platform ARCS-type system and other Chirpsounder nodes. In addition, Dynacast may maintain a file of service provider data, including coordinates, frequency lists, and status of each service provider site. Dynacast may also maintain an active Output file for each mobile platform including: tail or ID number, frequency lists, past connectivity profile (viz., last hour), ranked frequencies from Nowcast and Forecast algorithms, etc. Dynacast thus may forecast based upon projected changes in ionospheric parameters based upon linear trends plus changes in platform position. Dynacast includes a self-consistent scheme for evaluation and adjustment of its internal forecasting algorithms.

Dynacast utilizes a special set of rules to specify the forecasting regime to be used. One element of the rule set is the "generalized position" of the control point in temporal as well as spatial domains. Time is included in view of the significant variation in the geophysical properties of the medium with time. This generalized position includes information about the following: Universal Time, Local Time, geographic coordinates, geomagnetic coordinates, and proximity to the auroral oval, the polar cap, and other features which are related. Forecasting algorithms to be used within the middle latitudes, being far removed from the auroral oval, do not account for the magnetic index variations in the same way as control points located in the auroral oval or polar cap.

At midlatitudes, the effect of magnetic activity fluctuations is to modu late the F-region of the ionosphere in a smoothly-varying manner; and, in the case of large magnetic storms, introduce an initial rise in electron density (associated with the initial positive phase of the storm) followed by a large scale diminution in electron density (associated with the bay or main phase of the storm). This F-layer behavior in the face of a magnetic storm, a period of greatly elevated magnetic activity, is called an "ionospheric storm". On the other hand, if the control point is in close proximity to the auroral oval, the likelihood of F-layer "ionospheric storm" effects are small. The most important effects near the oval are: Propagation bandwidth enhancements arising from auroral sporadic E, MOF reduction with the F-layer trough region, enhanced side scatter (i.e., MOF-extension) from auroral irregularities, enhanced absorption from enhanced E region ionization within the auroral zone, irregular refraction within the polar cap, and excess absorption in the polar cap during PCA events. These features are unique with the high latitude region and require algorithms which carefully track the dynamic movement of the trough, oval, and cap in relation to the control points of the paths to be analyzed. Such algorithms are not important at midlatitudes. Independent data such as the planetary magnetic index Ap, used to specify the position of the oval and predictions of Ap used to develop positions of the oval. Other indices may also be used, such as forecasts of geophysical state from sources such as the Space Forecast Center run jointly by the Space Environment Laboratory and the U.S. Air Force, which is available over the Internet. This information, along with estimates of the future positions of the communication terminals (which specifies the projected control point position) is used to derive a forecast of communication performance, using methodologies specific to the generalized position of the control points with respect to the oval.

In certain embodiments, the present invention specifies the geophysical regime associated with the estimated control point position and modifies the current assessment for that control point based upon the rule set associated with the geophysical regime of relevance. The code to be exercised in the forecasting mode is the same as the code for the real-time mode with the exception that independent indices are used to estimate the intensity of future storm-time F-layer patterns at midlatitudes and the movement and intensity of the circumpolar features for high latitude circuits. The baseline for the forecast at a future time is the Dynacast assessment at an earlier time. Certain embodiment extrapolate into the future, under the presumption that current assessments have residual value for a period of time, and that forecasts are a balanced mix of currently observed ionospheric structure and estimates of the future ionospheric state derived from predicted motion of the ionosphere with respect to the moving control point (which may define a change in the relevant geophysical regime) and the Universal Time. The specific rule sets for temporal extrapolation in each regime are characterized as a series expansion in space and time. The specific expansions are determined for each region based upon Dynacast evaluation in that region over a period of time. Default expansions account only for control point motion and take the ionospheric state to be fixed, apart from local time adjustments in the electron density.

The present invention may also evaluate forecasting accuracy. Forecasting algorithms (and series coefficients) may be evaluated and modified to yield improved results. The present invention using its Chirpsounder -derived data base, delivers real-time assessments and a method for developing the most accurate short-term forecasting accuracy. Forecasting algorithms can be modified automatically based upon the learned behavior of the ionosphere. The method takes into account the best available external data, which may be utilized to specify the future position of the geophysical regime. It advances an estimate of the ionospheric state and makes a prediction based upon that state. It allows for a comparison to be made between the forecast (made earlier) and the actual realization based upon data from the Chirpsounder-ARCS System, and it allows for corrections to be made in the forecasting algorithms to improve performance. Thus, real-time assessments are utilized to improve the efficacy of ionospheric specification and HF communication assessments are improved.

Another embodiment of the present invention involves an upgrade to the Global Positioning System (GPS). The GPS is described in Kersley, L. (Editor), 1994, Proc. International Beacon Satellite Symposium, University of Wales, Aberystwyth, UK, 11–15 July, (2 volumes), which is herein incorporated by reference. The system will provide precise time, coordinate, and velocity information. The system space segment consists of a constellation of 24 satellites.

At any given site up to four satellites are in view, and each satellite transmits at two L-band frequencies, one of which is encrypted for military use. Owing to ionospheric dispersion, the path delay at the two frequencies is different. From this path delay difference, one may deduce the total electron content (or TEC) along the earth-space path. Conversely, knowledge of the TEC will enable the group-path-delay errors to be estimated and removed. The dual frequency concept is used to advantage in military systems to achieve the best accuracy. This is accomplished through excision of the ionospheric group-path delay which is a source of significant error.

Users who do not have access to both frequencies obtain reduced accuracy. The ground segment cost for a single frequency system is far less than that for a two-frequency system requiring reception and analysis of the encrypted signal. While dual-station methods or "differential GPS schemes" may be used, there is a need to improve the accuracy of autonomous single-frequency GPS ground segment units. The present invention's dynamic model of the ionosphere provides the basis for correction of errors introduced by the ionosphere without investment in dual-frequency GPS sets. The group-path-delay is derived from the TEC content derived from the ionospheric model.

In summary, an apparatus and method for real-time mapping and prediction of ionospheric properties and HF communication parameters has been described.

The present invention has been described in terms of a preferred embodiment. The invention, however, is not limited to the embodiment depicted and described. Rather the scope of the invention is defined only by the appended claims.

What is claimed is:

1. A method of providing a real-time map of ionospheric properties comprising:

providing an ionospheric model, wherein the ionospheric model provides a baseline description of ionospheric properties and wherein the model includes a critical frequency for an ionospheric layer;

providing a primary data source, the primary data source being indicative of real time propagation data obtained for the ionosphere in the vicinity of a control point and wherein the real time propagation data is indicative of the critical frequency for the ionospheric layer; and modifying the ionospheric model based on the real time propagation data obtained for the ionosphere in the vicinity of the control point including modifying the critical frequency for the ionospheric layer;

whereby the ionospheric model is updated according to real time propagation data.

2. A method as recited in claim 1 further including:

estimating high frequency signal propagation characteristics using the modified ionospheric model.

3. A method as recited in claim 1 wherein modifying the ionospheric model based on the real time propagation data obtained for the ionosphere further includes determining ionospheric characteristics in the vicinity of a grid point based upon propagation data obtained for the ionosphere in the vicinity of a plurality of control points.

4. A method as recited in claim 3 wherein the influence of the propagation data obtained for the ionosphere in the vicinity of each of the plurality of control points on the grid point is determined as a function of the distance from each of the control points to the grid point.

5. A method as recited in claim 4 wherein the influence of the propagation data obtained for the ionosphere in the vicinity of each of the plurality of control points on the grid point is determined as an exponential function of the distance from each of the control points to the grid point.

6. A method as recited in claim 1 wherein the ionospheric layer is the F2 layer and the critical frequency is the F2 critical frequency.

7. A method as recited in claim 1 wherein the ionospheric layer is the sporadic E layer and the critical frequency is the sporadic E critical frequency.

8. A method as recited in claim 1 wherein the real time propagation data obtained for the ionosphere in the vicinity of a control point includes data obtained from oblique incidence sounders, the oblique incidence sounders being located so that a one hop communication path exists between the sounders such that a signal transmitted between the oblique incidence sounders is reflected in the vicinity of the control point.

9. A method as recited in claim 1 wherein the real time propagation data obtained for the ionosphere in the vicinity of a control point includes data obtained from an ALE system including information about the greatest lower bound and wherein the greatest lower bound is used as an indication of an approximation of the maximum observable frequency.

10. A method as recited in claim 1 wherein the real time propagation data obtained for the ionosphere in the vicinity of a control point includes data obtained from an ALE system including information about the greatest lower bound and the least upper bound.

11. A method as recited in claim 1 wherein the real time propagation data obtained for the ionosphere in the vicinity of a control point includes data indicative of an approximation of a maximum observable frequency for a communication path that includes a reflection in the vicinity of the control point.

12. A method as recited in claim 11 wherein modifying the ionospheric model based on the real time propagation data obtained for the ionosphere in the vicinity of a control point includes conforming the ionospheric model to the real time propagation data by changing a maximum usable frequency calculated according to the ionospheric model to the maximum observable frequency.

13. A method as recited in claim 11 wherein modifying the ionospheric model based on the real time propagation data obtained for the ionosphere in the vicinity of a control point includes adapting the ionospheric model to the real time propagation data by changing a maximum usable frequency calculated according to the ionospheric model according to the ratio of the maximum observable frequency to the maximum usable frequency.

14. A method as recited in claim 11 wherein modifying the ionospheric model based on the real time propagation data obtained for the ionosphere in the vicinity of a control point includes adapting the ionospheric model to the real time propagation data by changing a maximum usable frequency calculated according to the ionospheric model according to the ratio of the maximum observable frequency to the maximum usable frequency.

15. A method as recited in claim 11 wherein the ionospheric layer is the F2 layer and wherein the critical frequency is the F2 critical frequency.

16. A method as recited in claim 15 wherein the modeled F2 layer critical frequency is modified in proportion to the ratio of the maximum observable frequency to the maximum usable frequency.

17. A method as recited in claim 11 wherein the ionospheric layer is the sporadic E layer and wherein the critical frequency is the sporadic E critical frequency.

18. A method as recited in claim 17 wherein the modeled sporadic E layer critical frequency is modified in proportion to the ratio of the maximum observable frequency to the maximum usable frequency.

19. A method as recited in claim 16 wherein the modeled F2 layer critical frequency is modified according to the distance of the control point to a grid point.

20. A method as recited in claim 1 wherein the real time propagation data obtained for the ionosphere in the vicinity of a control point includes a maximum observable frequency for a communication path that includes a reflection in the vicinity of the control point.

21. A method as recited in claim 1 further including
    providing ionospheric data to a single-frequency GPS module, and
    compensating for the group path delay of the GPS satellite signals using the ionospheric data.

22. A method as recited in claim 21 wherein estimating high frequency signal propagation characteristics further includes estimating ionospheric characteristics between grid points using interpolation.

23. A method as recited in claim 3 wherein the real time propagation data obtained for the ionosphere in the vicinity of a plurality of control points is augmented by temporally extrapolated propagation data that is obtained at a common time by temporally extrapolating raw data obtained at different times.

24. A real-time ionospheric mapping system comprising:
    a baseline ionospheric model, wherein the ionospheric model provides a baseline description of ionospheric properties and wherein the model includes a critical frequency for an ionospheric layer;
    a primary data source, the primary data source being indicative of real time propagation data obtained for the ionosphere in the vicinity of a control point and wherein the real time propagation data is indicative of the critical frequency for the ionospheric layer; and
    an real time adaptive module for modifying the ionospheric model based on the real time propagation data obtained for the ionosphere in the vicinity of a control point including modifying the critical frequency for the ionospheric layer;
    whereby the ionospheric model is updated according to real time propagation data.

25. A real-time ionospheric mapping system as recited in claim 24 further including:
    a skywave prediction module for estimating high frequency signal propagation characteristics using the modified ionospheric model.

* * * * *

UNITED STATES PATENT AND TRADEMARK OFFICE
CERTIFICATE OF CORRECTION

PATENT NO.   :   5,943,629

DATED        :   August 24, 1999

INVENTOR(S)  :   Ballard et al.

It is certified that error appears in the above-identified patent and that said Letters Patent is hereby corrected as shown below:

Column 4, line 39, delete "hindeasting" and enter --hindcasting--.

Column 16, line 16, delete "FoF2" and enter --foF2--.

Column 16, line 21, delete "FoF2" and enter --foF2--.

Column 18, line 6, delete "FoF2" and enter --foF2--.

Column 19, line 5, after "ionosphere" and before "contours", delete --,--.

Column 19, line 28, delete "un" and enter --unevenly spaced and represent real time data--.

Column 19, line 64, after "points" delete the second comma.

Column 21, line 27, after "is" and before "achieved", delete --a--.

Column 21, line 48, delete "FoF2" and enter --foF2--.

Column 22, line 21, delete "modu late" and enter --modulate--.

Signed and Sealed this

Second Day of May, 2000

*Attest:*

*Attesting Officer*

Q. TODD DICKINSON

*Director of Patents and Trademarks*